United States Patent
Wu et al.

(10) Patent No.: US 12,093,910 B2
(45) Date of Patent: Sep. 17, 2024

(54) PAYMENT PROCESSING METHODS AND APPARATUS

(71) Applicant: TENCENT TECHNOLOGY (SHENZHEN) COMPANY LIMITED, Shenzhen (CN)

(72) Inventors: Jinfa Wu, Shenzhen (CN); Jun Wang, Shenzhen (CN); Xinchang Lu, Shenzhen (CN); Shaoming Wang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 416 days.

(21) Appl. No.: 17/337,412

(22) Filed: Jun. 2, 2021

(65) Prior Publication Data
US 2021/0287193 A1    Sep. 16, 2021

Related U.S. Application Data

(63) Continuation of application No. PCT/CN2020/089945, filed on May 13, 2020.

(30) Foreign Application Priority Data

May 24, 2019  (CN) .......................... 201910437607.9

(51) Int. Cl.
*G06Q 30/00*     (2023.01)
*G06Q 20/12*     (2012.01)
(Continued)

(52) U.S. Cl.
CPC .......... *G06Q 20/12* (2013.01); *G06Q 20/385* (2013.01); *G06Q 30/0635* (2013.01); *H04L 69/321* (2013.01)

(58) Field of Classification Search
CPC ................. G06Q 20/12; G06Q 20/385; G06Q 30/0635; H04L 69/321
(Continued)

(56) References Cited

U.S. PATENT DOCUMENTS 8,233,416 B2    7/2012  Shirota et al.
8,346,929 B1 *  1/2013  Lai .......................... H04L 67/51
                                                    709/226
(Continued)

FOREIGN PATENT DOCUMENTS

CN    102982449 A    3/2013
CN    103824185 A    5/2014
(Continued)

OTHER PUBLICATIONS

Bennett, E. (2006). The meat of the matter; retailers including supermarket chain hannaford bros. are using consolidated, faster data networks to make key business decisions—such as how much ribeye to put out on a wednesday. Baseline, 1(64), 1-55. (Year: 2006) Retrieved from https://www.proquest.com/trade-journals/meat-matter-retailers-including-supermarket-chain/docview/213457727/se-2 (Year: 2006).*

(Continued)

*Primary Examiner* — Arielle E Weiner
(74) *Attorney, Agent, or Firm* — ANOVA LAW GROUP, PLLC

(57) ABSTRACT

A payment processing method is provided to be performed by a first device. The method includes obtaining order information and transmitting the order information to a second device for display, receiving a payment code transmitted by the second device, the payment code being generated by the second device according to a user payment identity after a payment confirmation instruction triggered by a user is received, obtaining a payment result by per- (Continued)

forming, in a payment account corresponding to the payment code, payment processing on the order information based on the payment code, and transmitting the payment result to the second device for display.

19 Claims, 15 Drawing Sheets

(51) Int. Cl.
*G06Q 20/38* (2012.01)
*G06Q 30/0601* (2023.01)
*H04L 69/321* (2022.01)

(58) Field of Classification Search
USPC ........................................................ 705/26.81
See application file for complete search history.

(56) References Cited

U.S. PATENT DOCUMENTS

| | | | | |
|---|---|---|---|---|
| 2011/0307318 | A1* | 12/2011 | LaPorte | G06Q 20/387 |
| | | | | 705/14.27 |
| 2018/0181951 | A1* | 6/2018 | Goldfinger | G07G 1/14 |
| 2018/0225672 | A1 | 8/2018 | Taira et al. | |
| 2018/0268408 | A1* | 9/2018 | Botros | G06Q 20/405 |
| 2019/0132229 | A1* | 5/2019 | McCormack | H04L 63/00 |
| 2019/0220866 | A1* | 7/2019 | Starr | G06V 40/172 |
| 2019/0295077 | A1* | 9/2019 | Mardikar | G06Q 20/401 |
| 2019/0385160 | A1* | 12/2019 | Safak | G06Q 20/3829 |
| 2020/0118101 | A1* | 4/2020 | Griffin | H04W 4/80 |
| 2020/0389469 | A1* | 12/2020 | Litichever | H04W 4/40 |

FOREIGN PATENT DOCUMENTS

| | | |
|---|---|---|
| CN | 103824185 B | 8/2017 |
| CN | 107221111 A | 9/2017 |
| CN | 109003066 A | 12/2018 |
| CN | 110414960 A | 11/2019 |
| EP | 2372628 A2 | 10/2011 |
| JP | 2001306985 A | 11/2001 |
| JP | 2008515356 A | 5/2008 |
| JP | 2009043185 A | 2/2009 |
| JP | 2014229137 A | 12/2014 |
| JP | 2017204028 A | 11/2017 |
| JP | 2018101420 A | 6/2018 |
| KR | 20140030366 A | 3/2014 |

OTHER PUBLICATIONS

The European Patent Office (EPO) The Extended European Search Report for 20815186.0 Jun. 10, 2022 7 pages.
The World Intellectual Property Organization (WIPO) International Search Report for PCT/CN2020/089945 Aug. 13, 2020 6 Pages (including translation).
The Japan Patent Office (JPO) Notification of Reasons for Refusal for Application No. 2021-565093 and Translation Jan. 30, 2023 10 Pages.

* cited by examiner

PAYMENT PROCESSING METHODS AND APPARATUS

RELATED APPLICATION(S)

This application is a continuation application of PCT Patent Application No. PCT/CN2020/089945, filed on May 13, 2020, which claims priority to Chinese Patent Application No. 201910437607.9, entitled "PAYMENT PROCESSING METHOD AND APPARATUS" filed with the China National Intellectual Property Administration on May 24, 2019, all of which are incorporated by reference in their entireties.

FIELD OF THE TECHNOLOGY

The present disclosure relates to the field of communication technologies, and in particular, to payment processing.

BACKGROUND

At present, the number of mobile payment users is growing rapidly, payment scenarios are greatly enriched because of a rapid penetration of the mobile payment into the field of offline payment, and requirements of the users on mobile payments are increasingly high. In the related art, a communication mode between a payment device (for example, a code scanner or a face recognition payment device) and a cash register is a one-way communication mode. The one-way communication mode may be as follows: information can be transmitted only from the payment device to the cash register side for receiving processing, while the cash register cannot transmit information to the payment device. As a result, two-way communication between the payment device and the cash register may not be readily achieved, and functionalities of the payment device may not be diversified enough.

SUMMARY

Embodiments of the present disclosure provide a payment processing method, an electronic device, and a computer-readable storage medium, to resolve a problem in the related art that two-way communication between a payment device and a cash register cannot be achieved, thereby helping improve a functional diversity of the payment device.

Specific technical solutions provided in the embodiments of the present disclosure are as follows:

In one aspect, the present disclosure provides a payment processing method, performed by a first device, the method including: obtaining order information and transmitting the order information to a second device for display; receiving a payment code transmitted by the second device, the payment code being generated by the second device according to a user payment identity of a user after receiving a payment confirmation instruction triggered by the user; performing, in a payment account corresponding to the payment code, payment processing on the order information based on the payment code, to obtain a payment result; and transmitting the payment result to the second device for display.

In yet another aspect, the present disclosure provides a payment processing apparatus, comprising: a memory storing computer program instructions; and a processor coupled to the memory and configured to execute the computer program instructions and perform: obtaining order information and transmitting the order information to a second device for display; receiving a payment code transmitted by the second device, the payment code being generated by the second device according to a user payment identity of a user after receiving a payment confirmation instruction triggered by the user; performing, in a payment account corresponding to the payment code, payment processing on the order information based on the payment code, to obtain a payment result; and transmitting the payment result to the second device for display.

In another aspect, the present disclosure provides a payment processing method, performed by a second device, the method including: receiving order information transmitted by a first device; displaying the order information; generating a payment code according to a user payment identity of a user after receiving a payment confirmation instruction triggered by the user, and transmitting the payment code to the first device; receiving a payment result transmitted by the first device, the payment result being obtained by the first device based on the payment code by performing, in a payment account corresponding to the payment code, payment processing on the order information; and displaying the payment result.

In yet another aspect, the present disclosure provides a payment processing apparatus, including: a first obtaining module, configured to obtain order information; a two-way communication module, configured to transmit the order information to a second device for display, and receive a payment code transmitted by the second device, the payment code being generated by the second device according to a user payment identity of a user after receiving a payment confirmation instruction triggered by the user; and a processing module, configured to perform, in a payment account corresponding to the payment code, payment processing on the order information based on the payment code, to obtain a payment result, the two-way communication module being further configured to transmit the payment result to the second device for display.

In yet another aspect, the present disclosure provides a payment processing apparatus, including: a two-way communication module, configured to receive order information transmitted by a first device; a first display module, configured to display the order information; a generation module, configured to generate a payment code according to a user payment identity of a user after a payment confirmation instruction triggered by the user is received, the two-way communication module being further configured to transmit the payment code to the first device, and receive a payment result transmitted by the first device, the payment result being obtained by the first device based on the payment code by performing, in a payment account corresponding to the payment code, payment processing on the order information; and a second display module, configured to display the payment result.

In yet another aspect, the present disclosure provides a computer-readable storage medium, storing a computer program, the computer program, when executed by a processor, implementing the steps of any one of the foregoing payment processing methods.

In yet another aspect, the present disclosure provides a computer program product including instructions, the computer program product, when run on a computer, causing the computer to perform the steps of any one of the foregoing payment processing methods.

In the embodiments of the present disclosure, the first device obtains the order information and transmits the order information to the second device, the second device displays the order information, and generates the payment code and transmits the payment code to the first device. The first device performs subsequent payment processing based on the payment code, and may transmit the payment result to the second device, so that the second device may display the payment result to the user. The first device and the second device have capabilities of two-way communication and can receive and transmit information from and to each other, thereby resolving a problem in the related art that a cash register cannot transmit a message to a payment device. In addition, the order information and the payment result can be displayed on the second device, so that the user can intuitively learn of details about a payment process. This helps improve the functional diversity of the payment device, improves user consumption experience, and improves security and correctness of payment.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Face recognition is a type of biometric technology for identity recognition based on facial feature information of a person. A video camera or a camera may be used for acquiring an image or a video stream including a face, the face in the image is automatically detected and tracked, and the detected face is recognized through a series of related technologies.

Face recognition payment is mainly based on face recognition technologies. Through obtaining of face information, a user who is bound to the face information is recognized for user identity without necessarily the need for the user to enter other information, and a payment is performed according to recognized user identity information.

Two-way communication is that both communication parties can receive and transmit data from and to each other.

Figure 1:
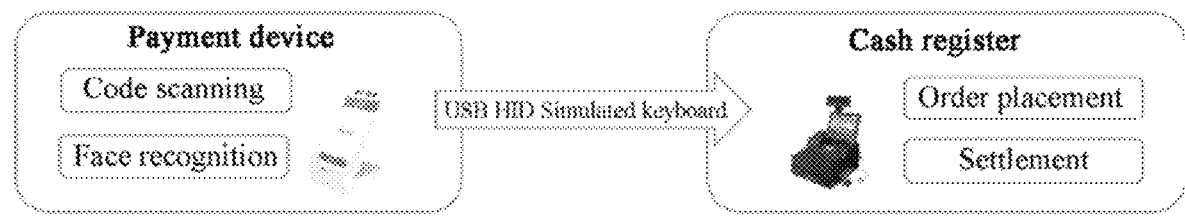
FIG. 1 is a schematic effect diagram of a communication mode between a payment device and a cash register.

In the related art, a store or a merchant usually uses a payment device and a cash register in combination to enable a customer to pay for a bill. A communication mode between the payment device (for example, a code scanner) and the cash register is a one-way communication mode, and a payment processing process based on the one-way communication mode is as follows: Information can only be transmitted from the payment device to the cash register, and the cash register further performs payment processing according to the received information. For example, FIG. 1 is a schematic effect diagram of a communication mode between a payment device and a cash register in the related art. One-way communication between the payment device and the cash register is achieved by using a universal serial bus (USB) human interface device (HID) simulated keyboard. A USB HID class is a standard device class of a USB device. A human-computer interaction keyboard can be simulated through a USB HID protocol. Therefore, the payment device can support code scanning or face recognition, and the cash register can support payment processing such as order placement and settlement. The payment device transmits acquired information to the cash register, and the cash register performs the subsequent payment processing to perform a payment.

However, in the payment processing process provided in the related art, the one-way communication mode between the payment device and the cash register makes control of an entire payment process simple, resulting in an undiversified function of the payment device. As a result, an information processing capability of the payment device is relatively poor, and a payment control capability of the payment device is reduced. Further, the payment processing process may not necessarily meet the needs of a merchant who intends to display membership, order, settlement and other information of a customer on the payment device during the payment process of the customer, and may not necessarily meet the needs of the customer who wants to intuitively learn of information about various payment details during the payment process, reducing consumption experience. It can be learned that to overcome shortcomings of the above payment processing process, it may be necessary to achieve the two-way communication between the cash register and the payment device. The present disclosure provides a payment processing method for this purpose.

In the embodiments of the present disclosure, a cash register is used as a first device, a payment device is used as a second device, and a payment processing method is provided. The first device is connected to the second device in a physical manner, a physical communication link is abstracted, and a standard read interface, write interface, and control interface are defined at a link layer, to shield a difference in physical communication links of hardware, thereby achieving a universal two-way communication framework. The first device and the second device may receive and transmit data packets from and to each other by using two-way communication modules, so that the two parties have capabilities of two-way communication. The first device obtains order information and may transmit the order information to the second device, the second device may display the order information, and the first device receives a payment code transmitted by the second device, performs payment processing based on the payment code, and transmits a payment result to the second device for display. The first device and the second device can communicate with each other in two directions, resolving the problem in the related art that the cash register cannot transmit a message to the payment device. The order information and the payment result can be displayed on the second device, so that a user can learn of information about payment details during a payment process, thereby improving consumption experience.

In addition, the first device may further transmit a user identity information request to the second device, and receive user identity information returned by the second device. When the first device determines that the user identity information indicates that the user is a registered member user, the first device obtains membership information corresponding to the user identity information, and transmits the membership information to the second device for display. In this way, the second device can further display the membership information of the user, improving convenience and user interactivity of the payment process, and improving user consumption experience.

Figure 2:
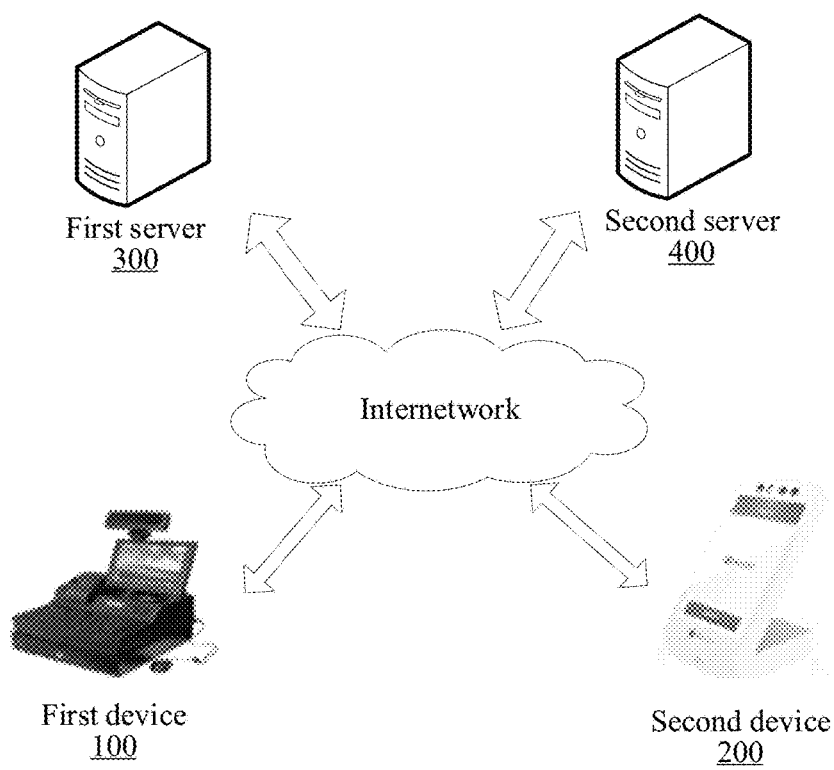
FIG. 2 is a schematic diagram of an application architecture of a payment processing method according to one or more embodiments of the present disclosure.

FIG. 2 is a schematic diagram of an application architecture of a payment processing method according to an embodiment of the present disclosure. The application architecture includes a first device 100, a second device 200, a first server 300, and a second server 400.

The first device 100 may be a terminal that faces toward a merchant, such as a cash register, or other terminal devices, which is not limited in the present disclosure. In addition, various applications (APP), such as checkout system software, may be installed on the first device 100.

The second device 200 is a terminal that faces toward a client or a customer, such as a payment device, which is not limited in the present disclosure. In addition, in this embodiment of the present disclosure, the second device 200 has an image acquisition apparatus such as a camera, which can acquire face information of a user, support face recognition of the user, and can further support a code scanning function. This is not limited in the present disclosure. In addition, the second device 200 also has a display interface, and can display information to the user through the display interface.

In this embodiment of the present disclosure, the first device 100 may be connected to the second device 200 in a physical manner by using a serial port, a network cable, a USB, Bluetooth, or the like, which is not limited in the present disclosure. Moreover, the first device 100 and the second device 200 receive and transmit data packets from and to each other based on two-way communication modules, and the two devices have capabilities to receive and transmit messages from and to each other, that is, two-way communication capabilities. For example, the second device 200 may transmit a membership code or a payment code to the first device 100, and the first device 100 may receive the membership code or the payment code transmitted by the second device 200, and after processing, transmit membership information or a payment result to the second device 200.

The first server 300 can provide various network services for the first device 100. For different application software on the first device 100, the first server 300 may be considered as a backend server providing corresponding network services. For example, in this embodiment of the present disclosure, if the first device 100 is a cash register, and the first server 300 is a backend server of a corresponding merchant, the first device 100 may transmit a member login request to the first server 300 based on a received membership code, and the first server 300 returns membership information of a corresponding user to the first device 100.

The second server 400 can provide various network services for the second device 200. In this embodiment of the present disclosure, the second device 200 can further support different payment platforms, from which the user may select according to requirements during payment. For the different payment platforms, the second server 400 may be a backend server providing corresponding network services. For example, the second device 200 may transmit acquired face information to the second server 400, to request to obtain user identity information, and the second server 400 may perform face recognition according to the face information, to obtain a user payment identity of the user in the payment platform. In addition, the second server 400 may further communicate with the first server 300, and obtain, from the first server 300, a membership code corresponding to the user payment identity, the membership code being an identity of the user pre-registered at the merchant. Then, the second server 400 transmits the obtained membership code to the second device 200.

Either the first server 300 or the second server 400 may be one server, or a server cluster or a cloud computing center including several servers.

Communication between the first device 100 and the first server 300, between the second device 200 and the second server 400, and between the first server 300 and the second server 400 can each be achieved through an internetwork. In certain embodiments, a standard communication technology and/or protocol is used for the internetwork described above. The internetwork is usually the Internet, but may alternatively be any other network, including but not limited to, a local area network (LAN), a metropolitan area network (MAN), a wide area network (WAN), or any combination of a mobile, wired, or wireless network, a dedicated network, or a virtual dedicated network. In some embodiments, technologies and/or formats such as the HyperText Markup Language (HTML) and the Extensible Markup Language (XML) are used for representing data exchanged through the network. In addition, all or some links may be encrypted by using conventional encryption technologies such as the Secure Sockets Layer (SSL), the Transport Layer Security (TLS), a virtual private network (VPN), and the Internet Protocol Security (IPsec). In some other embodiments, customized and/or dedicated data communication technologies may also be used in place of or in addition to the foregoing data communication technologies.

The diagram of the application architecture in this embodiment of the present disclosure is intended to more clearly describe the technical solutions of the embodiments of the present disclosure, and does not constitute a limitation to the technical solutions provided in the embodiments of the present disclosure. For other application architectures and service applications, the technical solutions provided in the embodiments of the present disclosure are also applicable to similar problems.

In the embodiments of the present disclosure, exemplary description is made by using an example in which a payment processing method is applicable to the application architecture shown in FIG. 2.

Figure 3:
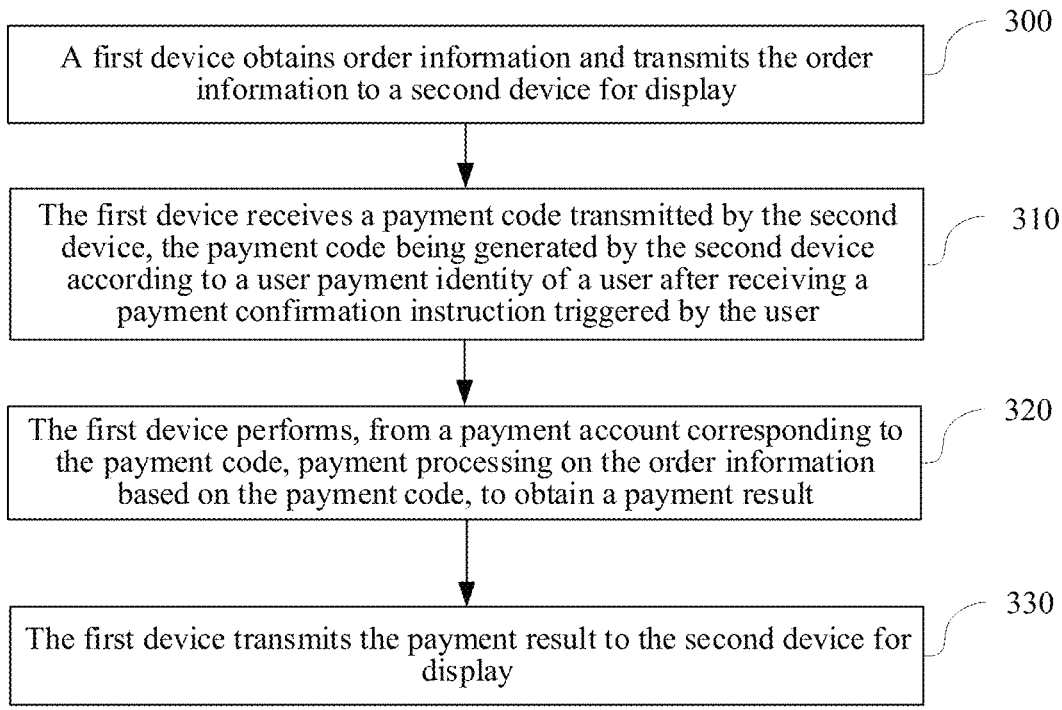
FIG. 3 is a flowchart of a payment processing method according to one or more embodiments of the present disclosure.

Based on the foregoing embodiments, FIG. 3 is a flowchart of a payment processing method according to an embodiment of the present disclosure. The method is mainly applied to a side of a first device and includes the following steps:

Step 300. The first device obtains order information and transmits the order information to a second device for display.

In this embodiment of the present disclosure, an example in which the first device is a cash register and the second device is a payment device is used for description. The first device and the second device enable each other to have capabilities of receiving and transmitting information from and to each other by using a designed two-way communication framework, that is, two-way communication modules.

In this way, when a user pays for a bill, a cashier enters product information according to a product purchased by the user, and the first device obtains finally generated order information, and may transmit the order information to the second device for display.

The order information includes, for example, a product name, a price, and a total amount, and may also include discount information, which is not limited in this embodiment of the present disclosure.

Step 310. The first device receives a payment code transmitted by the second device. The payment code is generated by the second device according to a user payment identity after receiving a payment confirmation instruction triggered by the user.

In certain embodiments, after receiving the order information, the second device may display the order information to the user, and the second device may further prompt the user to confirm the order information, so that after confirming that there is no error, the user clicks/taps the second device to confirm the payment to trigger the payment confirmation instruction. In this way, after receiving the payment confirmation instruction, the second device can generate a payment code of the user according to the user payment identity of the user and transmit the payment code to the first device.

The payment code is used for uniquely representing the user payment identity of the user. A representation manner of the payment code is not limited in this embodiment of the present disclosure. For example, the payment code may be represented by a two-dimensional code, or represented in a form of a picture or numbers.

In addition, the second device may generate the payment code according to the user payment identity confirmed by identity authentication. Therefore, this embodiment of the present disclosure further provides a possible implementation for the second device to generate the payment code, which is as follows: The second device obtains an identity characteristic entered by the user (for example, obtains face information), and transmits the user identity characteristic to a corresponding server. The corresponding server performs matching and recognition based on a preset mapping relationship between user identity characteristics and user payment identities (for example, a mapping relationship between user face information and user payment identities), and then returns the matched and recognized user payment identity to the second device, so that the second device generates a corresponding payment code according to the user payment identity. The identity characteristic is used for representing user identity information. The identity characteristic is not limited in this embodiment of the present disclosure. The identity characteristic may include, for example, at least one type of a face image of the user, a fingerprint of the user, a mobile phone number of the user, ID card information of the user, account information, and password information.

For example, the payment code may be a payment method selected by the second device based on the user. For example, if WeChat payment is selected, the user payment identity of the user in a WeChat payment platform, that is, a WeChat user identity, is confirmed through face recognition, and a payment code of WeChat is generated. The payment code is a single-use code, and is updated for each payment. The second device may generate the payment code online or offline. The payment code may include a string of payment numbers, and a backend server of WeChat stores a mapping relationship between the payment numbers and the WeChat user, for subsequent verification from the backend server of WeChat when the first device makes a payment according to the payment code.

Further, after the first device obtains the order information and transmits the order information to the second device, the method may further include: updating, by the first device, after the first device receives an order modification request returned by the second device, the order information according to the order modification request.

That is, after the second device displays the order information to the user, if the user confirms that the order is incorrect, the user may further click/tap to modify the order or click/tap the incorrect order to trigger the order modification request, so that after receiving the order modification request, the first device can update the order information by deleting and re-obtaining order information or editing and modifying the previous order information, and retransmit the updated order information to the second device for display, to enable the user to confirm again.

In this way, the user can learn of order details such as a price of each product before paying an amount, thereby ensuring correctness of the payment and improving user consumption experience.

Step 320. The first device performs, from a payment account corresponding to the payment code, payment processing on the order information based on the payment code, to obtain a payment result.

The payment result is used for representing a result of the payment processing performed on the order information by the first device. Moreover, the payment result may include payment success information, a payment amount, or payment failure information and the like, and may further include membership information updated after payment, for example, how many bonus points are added, newly added coupons, and the like, which may be set according to actual requests and needs, and is not limited in this embodiment of the present disclosure.

Step 320 may be as follows: The first device submits a payment request for payment for the order information to a first server based on the payment code. The first server (for example, a backend server of a merchant) transmits the payment request to a second server (for example, a backend server corresponding to the foregoing payment platform). The second server performs verification and matching on the payment code, and performs, from a payment account of the user corresponding to the payment code, payment processing on the order information, and returns the payment result to the first device by using the first server, so that the first device obtains the final payment result.

Step 330. The first device transmits the payment result to the second device for display.

In this embodiment of the present disclosure, the second device may receive the payment result transmitted by the first device, and display the payment result to the user, so that the user can learn of the payment result of the order information on the second device, and an entire payment process is performed in this way. The user can learn of payment information of the order information by using the second device, which helps improve a functional diversity of the second device.

In this embodiment of the present disclosure, the first device and the second device can receive and transmit information from and to each other, and the first device and the second device have more information transmission and interaction capabilities. The first device can transmit the order information and the payment result to the second device for display, resolving the problem in the related art that the two-way communication between the payment device and the cash register cannot be achieved. In this way, the user can intuitively view details of the entire payment process, so that the payment process is more transparent, thereby ensuring the correctness of the payment and improving user consumption experience.

Based on the foregoing embodiments, correspondingly, an embodiment of the present disclosure further provides another payment processing method, mainly applied to a second device.

Figure 4:
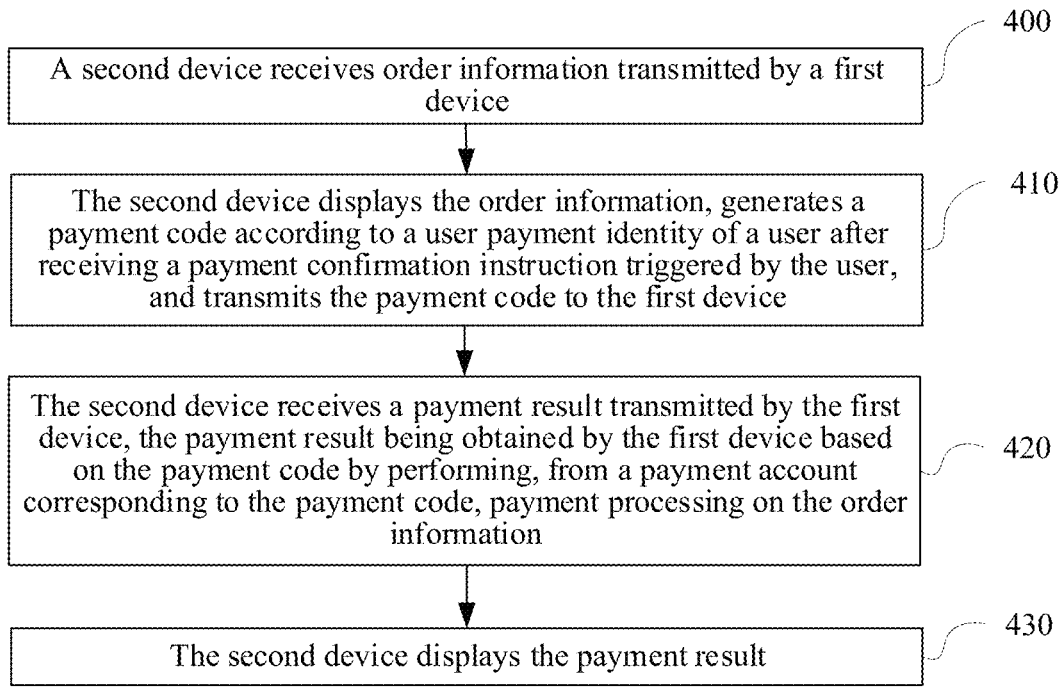
FIG. 4 is a flowchart of another payment processing method according to one or more embodiments of the present disclosure.

FIG. 4 is a flowchart of another payment processing method according to an embodiment of the present disclosure. The method includes the following steps:

Step 400. The second device receives order information transmitted by a first device.

Step 410. The second device displays the order information, generates a payment code according to a user payment identity of a user after receiving a payment confirmation instruction triggered by the user, and transmits the payment code to the first device.

Step 420. The second device receives a payment result transmitted by the first device, the payment result being obtained by the first device based on the payment code by performing, from a payment account corresponding to the payment code, payment processing on the order information.

Step 430. The second device displays the payment result.

In this embodiment of the present disclosure, the payment processing method on a side of the second device corresponds to the payment processing method on a side of the first device, and specific implementation processes are the same. Therefore, details are not described herein again.

Figure 5:
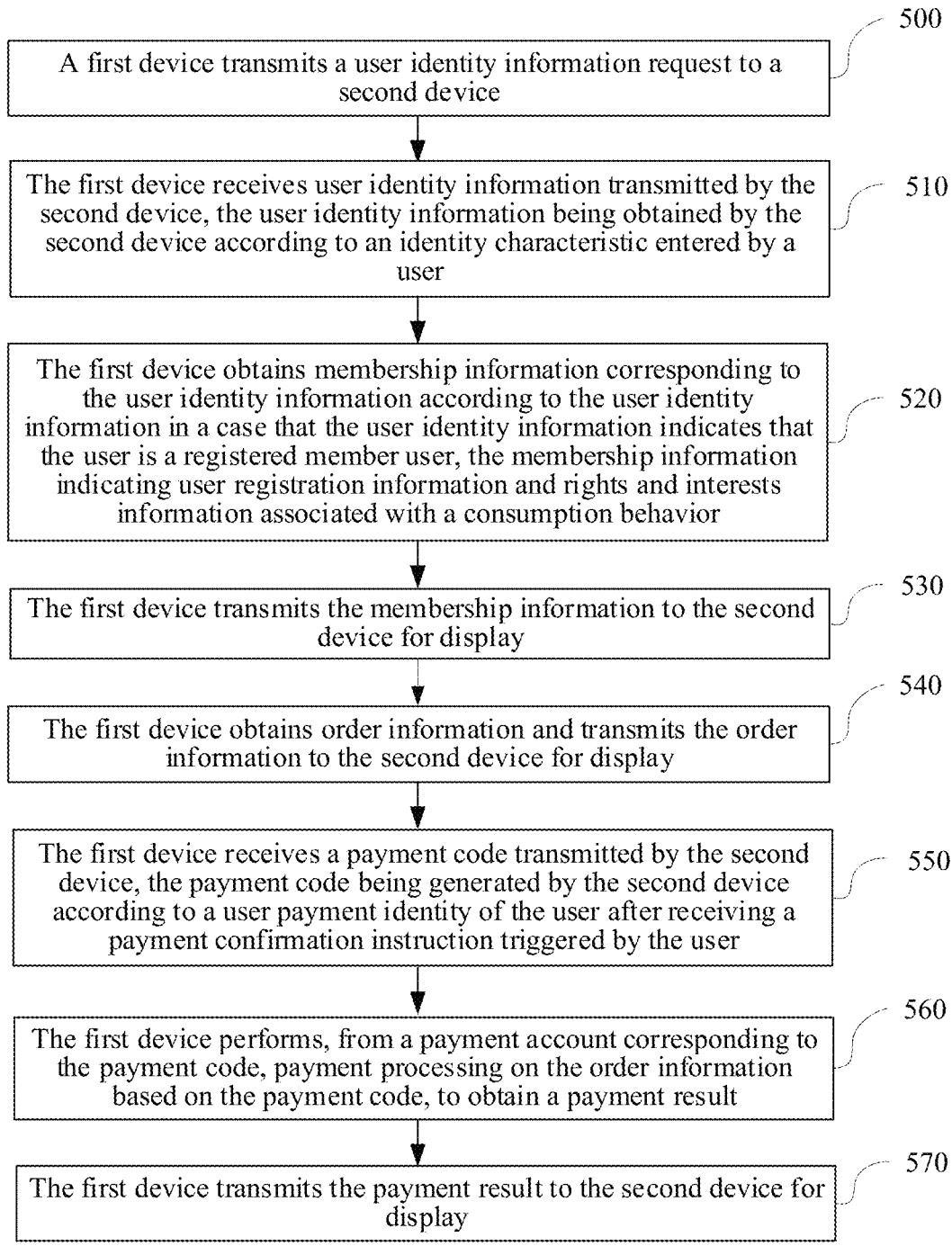
FIG. 5 is a flowchart of a payment processing method according to one or more embodiments of the present disclosure.

Further, the first device may further transmit membership information to the second device, so that the second device can also display the membership information in addition to the order information and the payment result. In certain embodiments, FIG. 5 is a flowchart of another payment processing method according to an embodiment of the present disclosure. The method is mainly applied to the first device side and includes the following steps:

Step 500. The first device transmits a user identity information request to the second device.

For example, when a user starts paying a bill, a cashier triggers the user identity information request on the first device (for example, a cash register), to enable the first device to transmit the user identity information request to the second device (for example, a payment device) by using a two-way communication module, for the second device to identify the user.

Step 510. The first device receives the user identity information transmitted by the second device, the user identity information being obtained by the second device according to an identity characteristic entered by the user.

In certain embodiments, after receiving the user identity information request, the second device may first prompt the user to enter the identity characteristic (for example, prompt the user to perform code scanning or face recognition), and after obtaining the identity characteristic entered by the user, the second device may perform matching processing on the identity characteristic by using a server, to obtain user identity information corresponding to the identity characteristic.

The user identity information is used for indicating an identity of the user, and the user identity information is not limited in this embodiment of the present disclosure. For example, if the identity characteristic is face information, the user identity information is obtained by the second device according to the acquired face information through matching by using the server. If the user identity information indicates that the user is a registered member user, the user identity information is a membership code of the user.

For example, if the second device supports face recognition payment, after receiving the user identity information request transmitted by the first device, the second device triggers face recognition and prompts the user to face a camera for face recognition, to acquire the face information of the user, and transmit the face information to a second server, so that the second server first performs the face recognition, determines an identity (that is, a user payment identity) corresponding to the face information, then requests a membership code corresponding to the identity from the first server, and returns the membership code obtained from the first server to the second device, so that the second device transmits the membership code to the first device.

Further, if the face recognition fails according to the face information, it indicates that the user is not a registered member user, the second device may return to the first device prompt information that the user is not a registered member user, and then the first device does not need to request corresponding membership information.

Step 520. The first device obtains membership information corresponding to the user identity information according to the user identity information when or in response to determining the user identity information indicates that the user is a registered member user, the membership information indicating user registration information and rights and interests information associated with a consumption behavior.

In certain embodiments, the first device requests member login from the first server according to the user identity information, and obtains the membership information corresponding to the user identity information from the first server.

The membership information includes, for example, current membership rights and interests, a membership level, and a bonus point, which is not limited in this embodiment of the present disclosure.

Step 530. The first device transmits the membership information to the second device for display.

It can be learned that the user can learn of the membership information on the second device and learn of membership rights and interests of the user, thereby improving user consumption experience.

After step 530 is further performed, the cashier may enter product information by using the first device, generate an order, and perform a subsequent payment process, that is, the following step 540 to step 570.

Step 540. The first device obtains order information and transmits the order information to the second device for display.

Step 550. The first device receives a payment code transmitted by the second device, the payment code being generated by the second device according to a user payment identity of the user after receiving a payment confirmation instruction triggered by the user.

Step 560. The first device performs, from a payment account corresponding to the payment code, payment processing on the order information based on the payment code, to obtain a payment result.

Step 570. The first device transmits the payment result to the second device for display.

It can be learned that the first device may further obtain the membership information, and calculate some information (for example, an actual price of a discounted product) in the order information based on the membership information (for example, whether there is a coupon, or whether there are membership discounts for certain products) when the order information is generated. Moreover, the first device may further transmit the membership information to the second device, and the second device may display the membership information, the order information, the payment result, and other information. Therefore, control capabilities in a payment process are stronger and richer.

Figure 6:
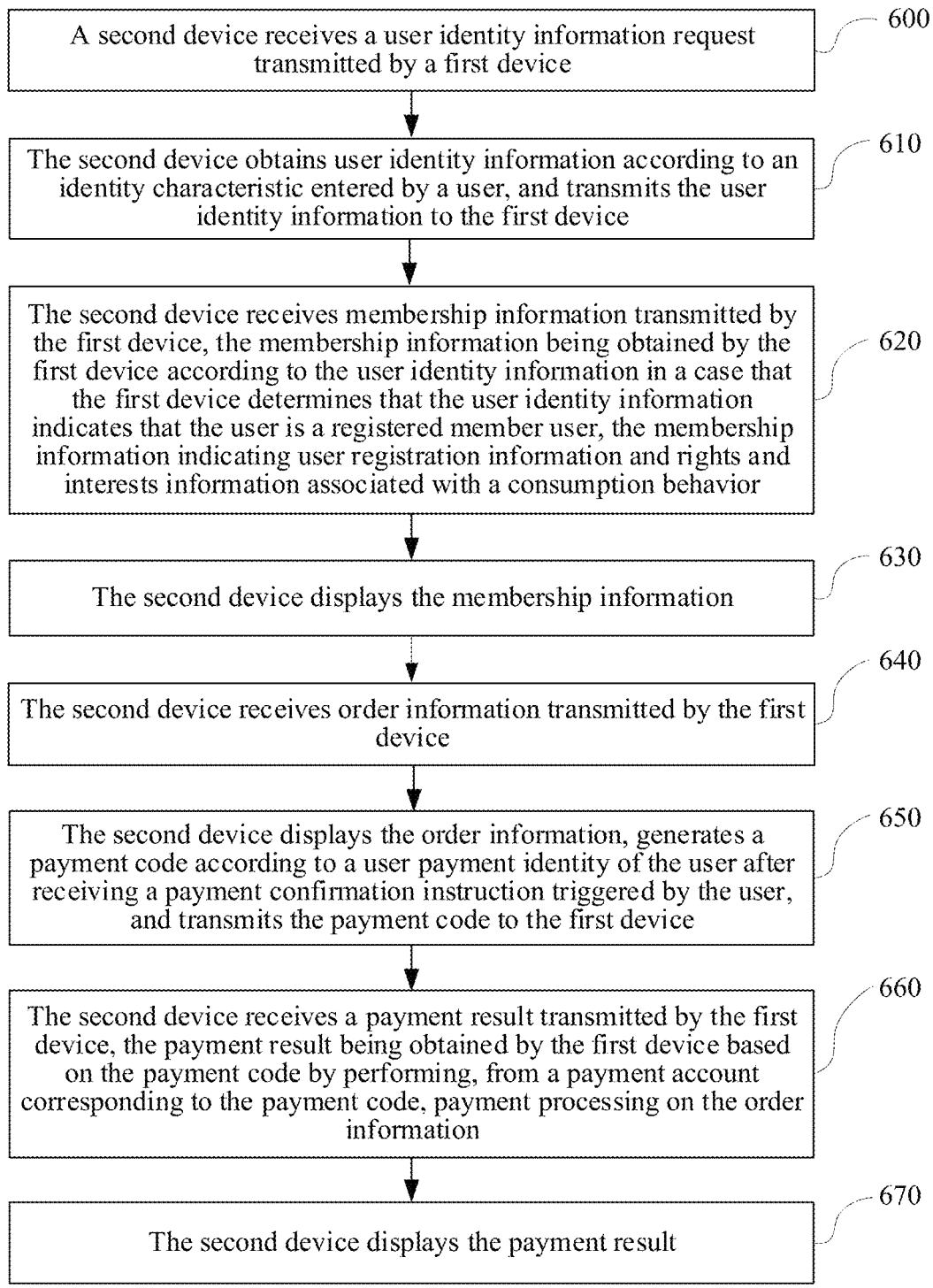
FIG. 6 is a flowchart of another payment processing method according to one or more embodiments of the present disclosure.

Correspondingly, corresponding to the embodiment shown in FIG. 5, an embodiment of the present disclosure further provides another payment processing method. FIG. 6 is a flowchart of another payment processing method according to an embodiment of the present disclosure. The method is mainly applied to a second device and includes the following steps:

Step 600. The second device receives a user identity information request transmitted by a first device.

Step 610. The second device obtains user identity information according to an identity characteristic entered by a user, and transmits the user identity information to the first device.

Step 620. The second device receives membership information transmitted by the first device, the membership information being obtained according to the user identity information when or in response to determining the first device determines that the user identity information indicates that the user is a registered member user, the membership information indicating user registration information and rights and interests information associated with a consumption behavior.

Step 630. The second device displays the membership information.

Step 640. The second device receives order information transmitted by the first device.

Step 650. The second device displays the order information, generates a payment code according to a user payment identity of the user after receiving a payment confirmation instruction triggered by the user, and transmits the payment code to the first device.

Step 660. The second device receives a payment result transmitted by the first device, the payment result being obtained by the first device based on the payment code by performing, from a payment account corresponding to the payment code, payment processing on the order information.

Step 670. The second device displays the payment result.

It can be learned that the first device and the second device have two-way communication capabilities. The second device can further receive the membership information, the order information, the payment result, and the like transmitted by the first device for display, to display more information about payment details to the user.

In this embodiment of the present disclosure, the first device and the second device achieve the two-way communication capabilities by using a designed two-way communication framework. In certain embodiments, the first device and the second device receive and transmit data packets from and to each other based on two-way communication modules.

The data packet may be the foregoing user identity information request, the membership information, the order information, the payment code, the payment result, and the like, and may further include some response packets. Interaction manners of the data packet and the response packet are both implemented by using the two-way communication module.

That the first device and the second device receive and transmit data packets from and to each other based on two-way communication modules includes: transmitting, by the first device, a data packet through a service layer, an application layer, a transport layer, and a link layer sequentially, and receiving a data packet through the link layer, the transport layer, the application layer, and the service layer sequentially; and transmitting, by the second device, the data packet through the service layer, the application layer, the transport layer, and the link layer sequentially, and receiving the data packet through the link layer, the transport layer, the application layer, and the service layer sequentially.

Figure 7:
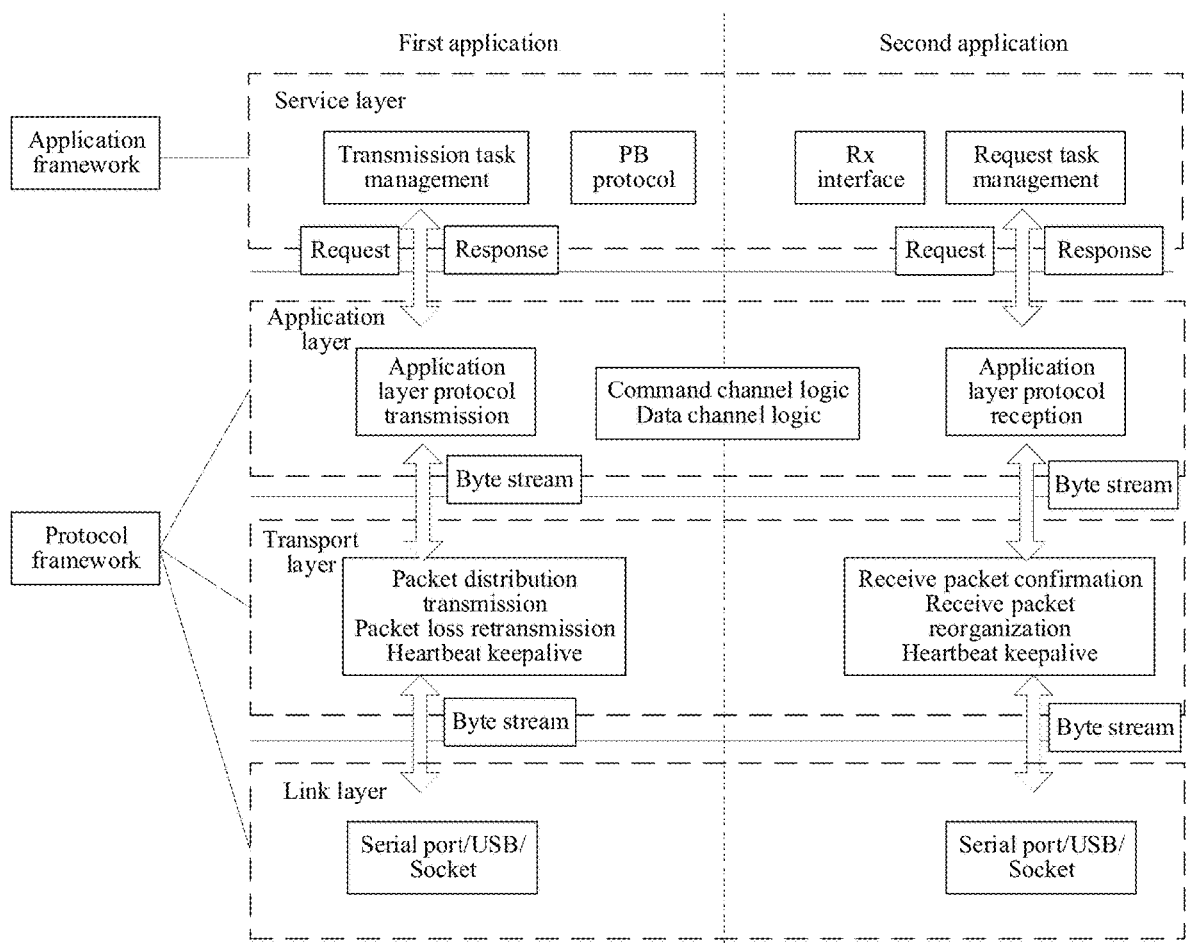
FIG. 7 is a schematic diagram of a principle of a two-way communication framework according to one or more embodiments of the present disclosure.

In certain embodiments, the following describes the two-way communication framework of the embodiments of the present disclosure. FIG. 7 is a schematic diagram of a principle of a two-way communication framework according to an embodiment of the present disclosure.

As shown in FIG. 7, a protocol framework and an application framework are included. The application framework has a service layer, and the service layer is invoked during use of a service. Different interfaces or protocols such as a protocol buffer (PB) protocol and a receive (Rx) interface may be set based on different services, which are not limited in this embodiment of the present disclosure. The protocol framework may be divided into a link layer, a transport layer, and an application layer. The layers cooperate with each other to perform a two-way communication function. In this embodiment of the present disclosure, a layered design is mainly adopted to abstract a protocol level, and the layers in the protocol framework are described below.

(1) Link Layer.

Function definition: The link layer is responsible for link layer data connection, shielding a difference in physical communication links of hardware, and providing an upper layer with capabilities to read and write original data and a capability to operate the physical communication link, that is, a capability to control on/off of physical communication.

In certain embodiments, a standard read interface, write interface, and control interface are defined at the link layer, and the physical communication link is used as a link layer protocol, so that the data packet is transferred to the transport layer through the physical communication link and the standard read interface, write interface or control interface, and the data packet is transferred to the physical communication link through the transport layer and the standard read interface, write interface or control interface.

The physical communication link at the link layer adopts any one of an RS232 interface, a USB, a network cable, and Bluetooth, and is, for example, a socket interface and a serial port. However, this embodiment of the present disclosure is not limited to these physical communication links, and other physical communication links may also be adopted according to actual requirements. In FIG. 7, only the serial port, the USB, and the socket interface are described as an example.

It can be learned that compared with a current design for specific hardware, such as a design for the serial port, which has relatively poor adaptability and portability because invocation interfaces or protocols of the link layer and the transport layer may further need to be remodified during replacement of another physical communication link, in this embodiment of the present disclosure, the physical communication link for actual communication is abstracted, and a plurality of transmission mediums can be supported, that is, different physical communication links are supported, and differences between the different physical communication links are shielded. In this way, regardless of actual use of the USB, the serial port, the network cable, or the Bluetooth, the two-way communication framework provided in this embodiment of the present disclosure can be used for completing communication without modification. When the physical communication link may need to be switched, only the standard read interface, write interface, and control interface required by the link layer may need to be implemented, which may be completely invisible to the upper layer.

Figure 8:
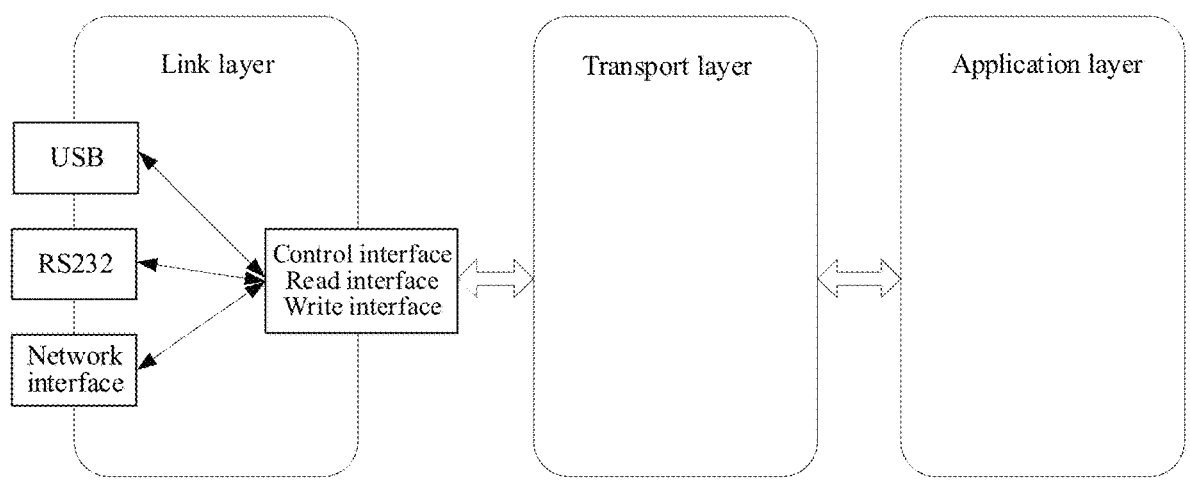
FIG. 8 is a schematic diagram of a design effect of a link layer according to one or more embodiments of the present disclosure.

FIG. 8 is a schematic diagram of a design effect of a link layer according to an embodiment of the present disclosure. As shown in FIG. 8, the standard read interface, write interface, and control interface are defined at the link layer. The link layer and the transport layer perform data communication through the standard read interface, write interface or control interface, and only the standard read interface, write interface or control interface may need to be designed and invoked at the transport layer. Different physical communication links are invisible to the transport layer. The different physical communication links such as the USB, the RS232 interface, and a network port are adapted to the standard read interface, write interface or control interface.

In this embodiment of the present disclosure, when the link layer is implemented, the required physical communication link may be used to connect a first device and a second device. For example, the second device selects the RS232 interface as an underlying communication link, and simultaneously uses an RS232 to USB cable to communicate with the first device.

(2) Transport Layer.

Function definition: The transport layer is located between the application layer and the link layer, and is mainly responsible for reading the link layer data, performing tasks such as parsing, verification, acknowledgement, and deduplication, correctly delivering valid data to the application layer, and performing tasks such as assembling, transmitting, and waiting for acknowledgement on data that the application layer may need to transmit, thereby providing a stable, reliable, and state-knowable communication interface for the upper service layer.

In certain embodiments, according to a customized protocol packet format, the data transmitted from the application layer and the data read from the link layer are separately parsed, and implementation logic such as verification, acknowledgement (ACK), or retransmission is agreed upon, and connectivity of the physical communication link of the link layer is detected at the transport layer by using a heartbeat keepalive mechanism.

Figure 9:
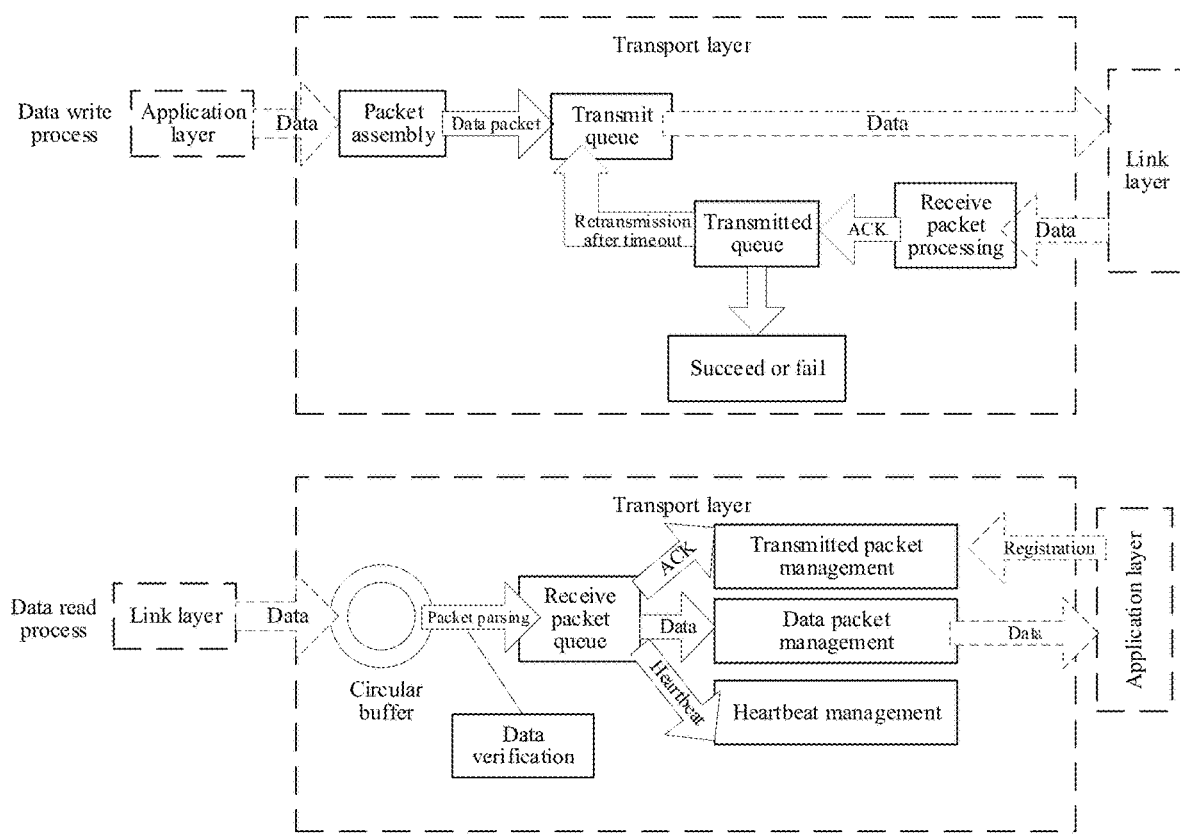
FIG. 9 is a schematic diagram of a receiving and transmitting process of a transport layer according to one or more embodiments of the present disclosure.

FIG. 9 is a schematic diagram of a receiving and transmitting process of a transport layer according to an embodiment of the present disclosure. The process includes a data write process and read process, and includes the following steps:

A first aspect: The data write process, that is, a transmission process, is to transmit the data of the application layer to the link layer.

Perform packet assembly on the data transmitted by the application layer and place the data into a transmit queue in a form of data packets.

Sequentially transmit the data packets in the transmit queue to the link layer.

Receive data returned by the link layer and perform receive packet processing.

Determine, if the data packet is an ACK packet, that a corresponding data packet in the transmitted queue is transmitted successfully, and determine, if no packet is received or a number of retransmissions is exceeded, that the corresponding data packet in the transmitted queue fails to be transmitted.

Wait for an acknowledgement response from the link layer for the data packet in the transmitted queue, and retransmit the data packet if a time threshold is exceeded.

A second aspect: The data read process, that is, a receiving process, is to read the data of the link layer and transmit the data to the application layer.

Parse the data of the link layer, and perform data verification.

A signature algorithm may be used for performing the data verification to verify whether the data is correct, and the algorithm is not limited herein.

Place the received data into a receive packet queue, determine a packet type, and if the data packet is an ACK packet, manage the transmitted data packet according to the ACK packet, for example, remove a transmitted data packet corresponding to the ACK packet, or if the data packet is a data packet including actual data content, manage the data packet, for example, perform receive packet queue management, deduplication processing, or returning a corresponding ACK packet, or if the data packet is a heartbeat packet, the heartbeat packet being mainly used for detecting the connectivity of the link layer, perform heartbeat management, for example, maintain a status of the link layer according to the heartbeat packet, and return the corresponding ACK packet. Heartbeat detection may adopt, for example, a synchronized sequence number (SYN) protocol, which is not limited herein.

The application layer registers at the transport layer in advance and monitors whether data arrives at the transport layer. After receiving the data packet, the transport layer transmits the data packet to the application layer.

(3) Application Layer.

Function definition: The application layer is located between the service layer and the transport layer, and is mainly responsible for receiving or transmitting data according to an agreed application layer protocol. The data obtained from the transport layer may be parsed and identified according to the agreed protocol, and an application protocol such as client/server (C/S) communication or peer-to-peer communication is provided.

Figure 10:
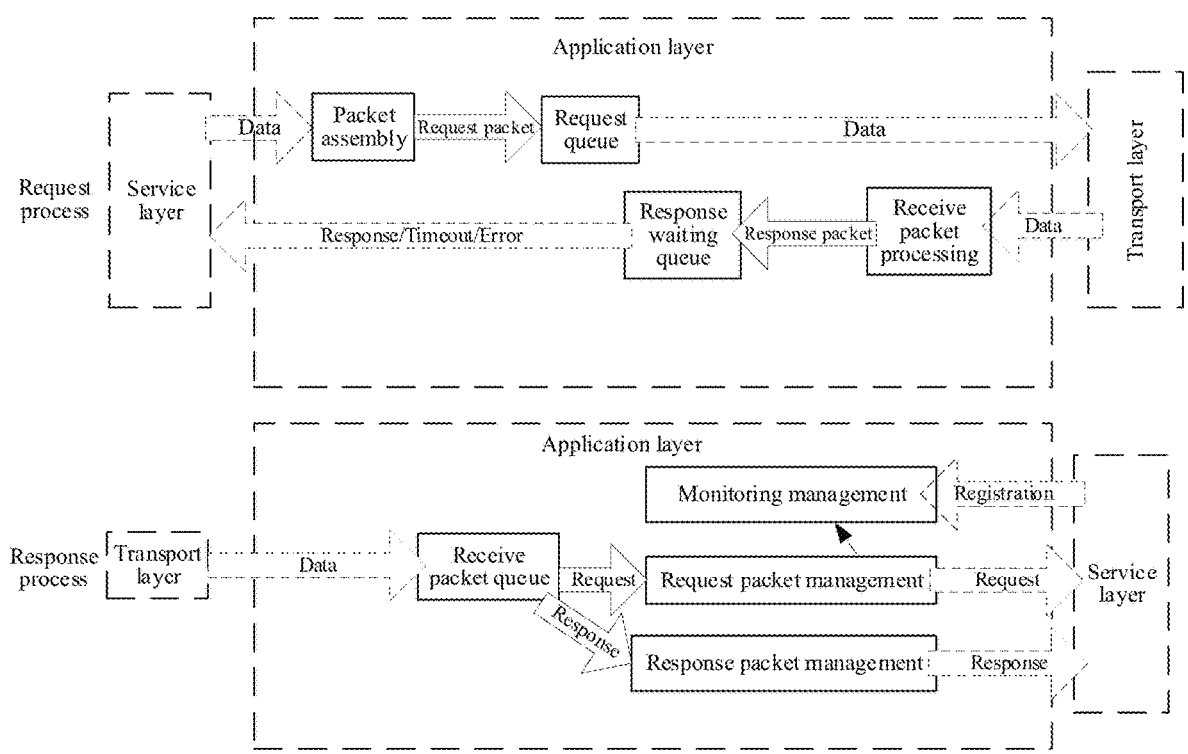
FIG. 10 is a schematic diagram of a request-response process of an application layer according to one or more embodiments of the present disclosure.

In certain embodiments, the application layer transmits data to the transport layer, receives data transmitted by the transport layer, and transmits the data received from the transport layer to the service layer. Two communicating terminals can have both client and server capabilities. The communication between the two terminals may be implemented in a request-response mode. In certain embodiments, FIG. 10 is a schematic diagram of a request-response process of an application layer according to an embodiment of the present disclosure. The process includes a request process and a response process, and includes the following steps:

A first aspect: The request process, that is, a transmission process, is to transmit the data of the service layer to the transport layer.

The request process is similar to the data write process of the transport layer, and includes the following steps:

S21. Perform packet assembly on the data transmitted by the service layer and place request packets into a request queue.

S22. Sequentially transmit the request packets in the request queue to the transport layer.

S23. Receive data returned by the transport layer and perform receive packet processing.

S24. Process each request packet in a response waiting queue according to a returned response packet, and perform processes such as acknowledgement response, time-out retransmission, and error to transmit the response packet to the service layer.

A second aspect: The response process, that is, a receiving process, is to transmit the data of the transport layer to the service layer.

S31. Parse the data of the transport layer.

S32. Place the received packet into the receiving packet queue, determine a packet type, and if the packet is a response packet, perform response packet management, for example, find a corresponding original request from the response waiting queue, and transmit the response packet to the service layer, or if the packet is a request packet, perform request packet management, for example, inform a listener that there is a new request, the listener herein being the service layer.

S33. The service layer registers at the application layer in advance and monitors whether data arrives at the application layer. After receiving the request packet, the application layer transmits the request packet to the service layer.

It can be learned that as shown in FIG. 7, when a first application in the first device and a second application in the second device perform two-way communication, the two-way communication framework is used for both transmitting and receiving data, and communication processes are the same. In addition, a process in which one party transmits data to the other party and the other party receives the data is that the one party transmits the data through the service layer, the application layer, the transport layer, and the link layer, and the other party receives the data through the link layer, the transport layer, the application layer, and the service layer.

It can be learned that in the two-way communication framework provided in this embodiment of the present disclosure, a multi-layer protocol design is adopted, and the two-way communication function is achieved through multi-layer cooperation. In addition, standard interfaces defined at the link layer can support different physical communication links, and shield differences between the physical communication links, which is applicable to various different physical communication links. Therefore, applicability is stronger, and a unified and convenient invocation interface can be provided for an application and a service, thereby achieving stable, reliable, and consistent two-way data transmission.

This embodiment of the present disclosure merely provides an example of a two-way communication framework, and the protocol level may be extended or simplified according to requirements. For example, a function of a specific layer may be merged upward or downward into an adjacent layer, or a function of a specific layer may be subdivided into one or two layers, which is not limited herein.

Figure 11:
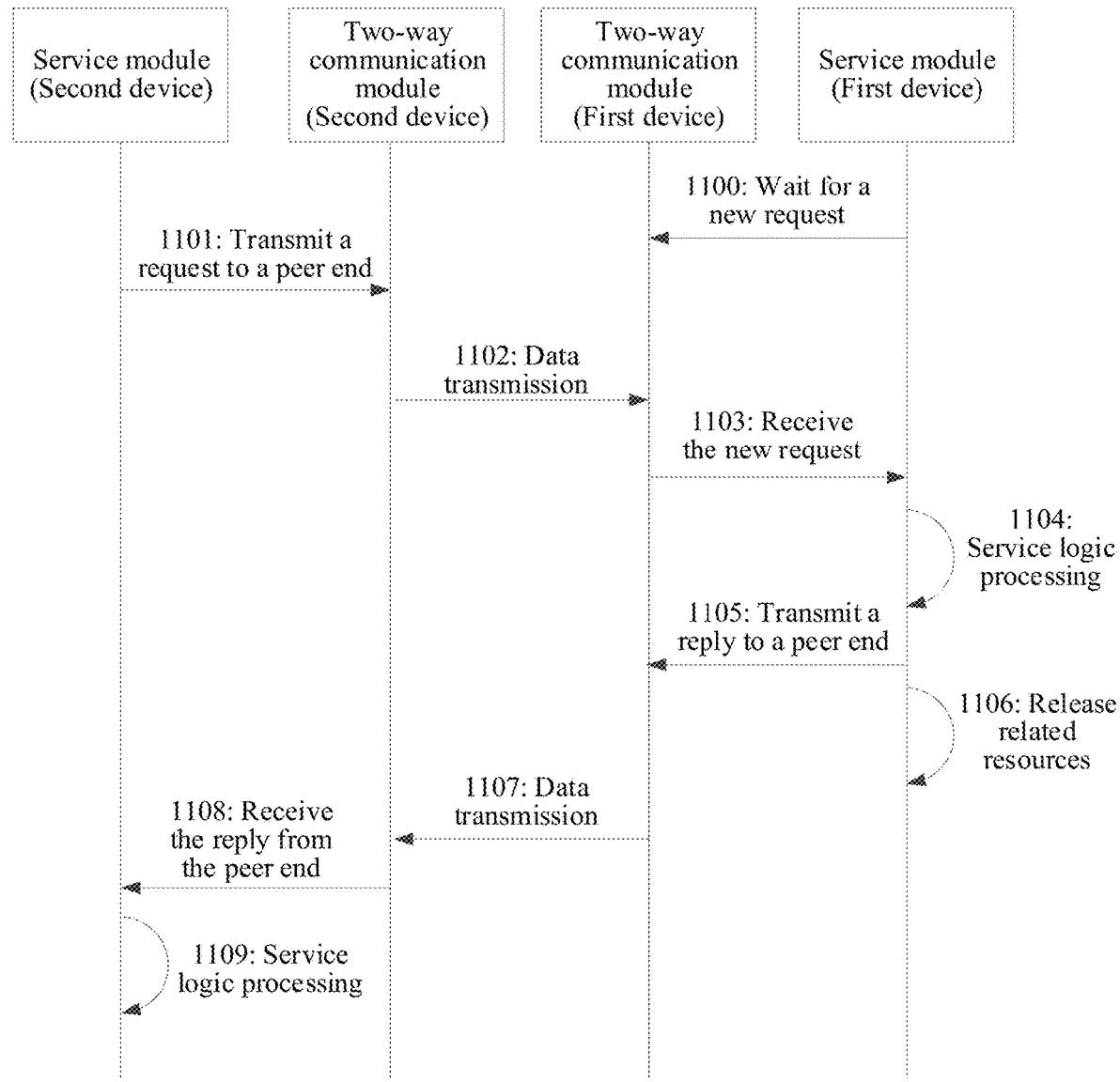
FIG. 11 is an interaction flowchart of a second device transmitting information to a first device according to one or more embodiments of the present disclosure.

Based on the foregoing embodiments, the following briefly describes a process of two-way communication between the first device and the second device. FIG. 11 is an interaction flowchart of a second device transmitting information to a first device according to an embodiment of the present disclosure. The following steps are included:

Step 1100. A service module of the first device waits for a new request by using a two-way communication module.

That is, the first device may detect, by using the two-way communication module, whether the second device transmits a request.

Step 1101. A service module of the second device transmits a request to a peer end by using a two-way communication module.

For example, the request herein may be a data packet such as a membership code or a payment code transmitted from the second device to the first device, so that the first device performs corresponding processing based on the request transmitted by the second device.

Step 1102. The two-way communication module of the second device transmits data to the two-way communication module of the first device.

Step 1103. The two-way communication module of the first device informs the service module that a new request is received.

Step 1104. The service module of the first device performs service logic processing.

For example, if a payment code is received, the first device performs subsequent payment processing based on the payment code, and may reply to the second device with a payment result.

Step 1105. The service module of the first device transmits a reply to a peer end by using the two-way communication module.

Step 1106. The service module of the first device releases related resources.

Step 1107. The two-way communication module of the first device transmits data to the two-way communication module of the second device.

In this way, the reply data of the first device to the request is transmitted to the second device by using the two-way communication module.

Step 1108. The two-way communication module of the second device informs the service module that the reply of the peer end (that is, the first device) is received.

Step 1109. The service module of the second device performs service logic processing.

That is, the second device may perform corresponding service logic processing based on the reply data of the first device.

Figure 12:
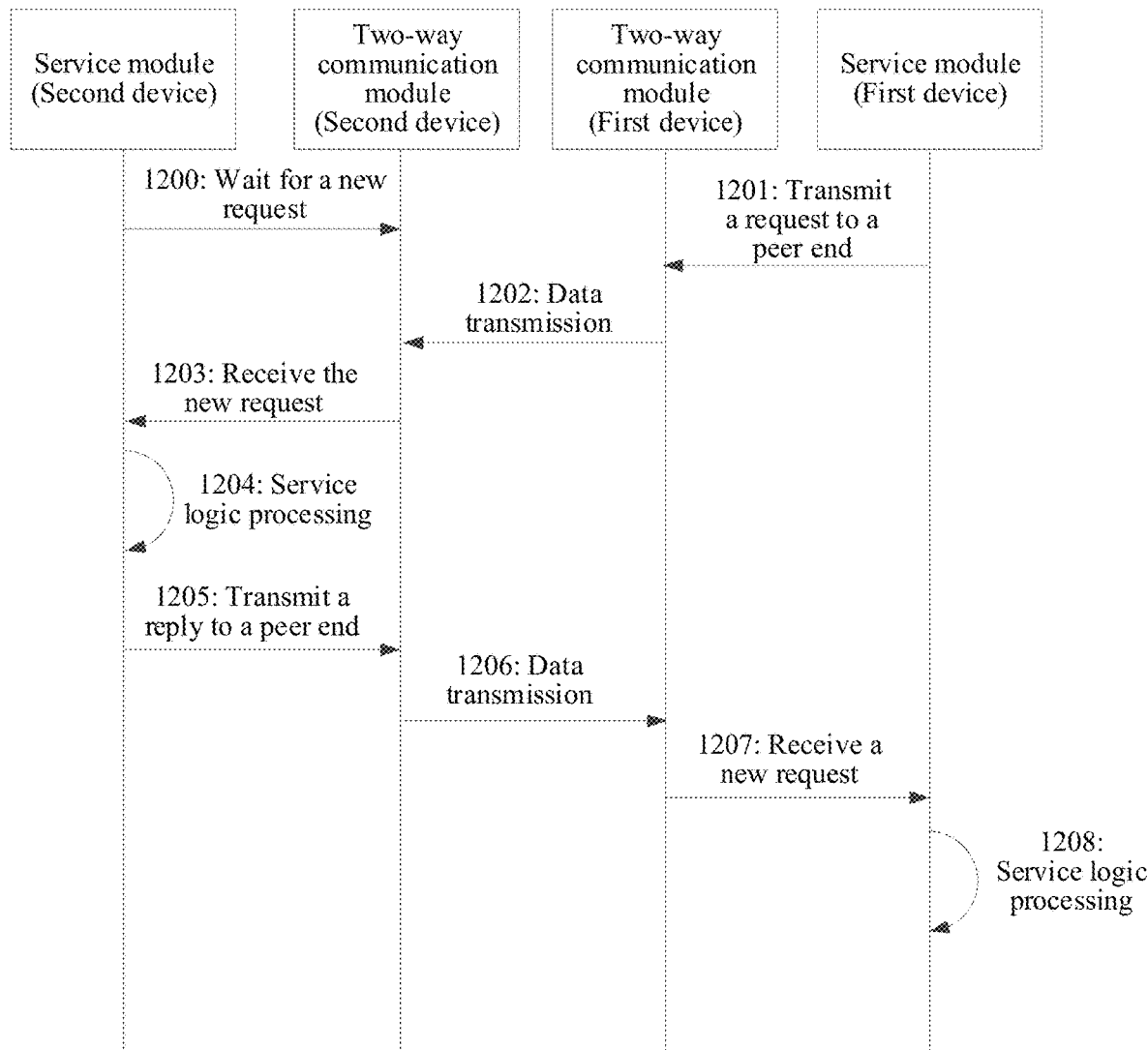
FIG. 12 is an interaction flowchart of a first device transmitting information to a second device according to one or more embodiments of the present disclosure.

Correspondingly, FIG. 12 is an interaction flowchart of a first device transmitting information to a second device according to an embodiment of the present disclosure. The following steps are included:

Step 1200. A service module of the second device waits for a new request by using a two-way communication module.

That is, the second device may monitor, by using the two-way communication module, whether the first device transmits a request.

Step 1201. A service module of the first device transmits a request to a peer end (that is, the second device) by using a two-way communication module.

For example, the request herein may be a data packet such as a user identity information request, order information, membership information, or a payment result transmitted by the first device to the second device.

Step 1202. The two-way communication module of the first device transmits data to the two-way communication module of the second device.

Step 1203. The two-way communication module of the second device informs a service module that a new request is received.

Step 1204. The service module of the second device performs service logic processing.

For example, if order information, payment result, or membership information is received, the order information, the membership information, or the payment result is displayed.

In another example, if a user identity information request is received, related processing of obtaining user identity information provided above is performed to obtain corresponding user identity information.

Step 1205. The service module of the second device transmits a reply to a peer end (that is, the first device) by using the two-way communication module.

Step 1206. The two-way communication module of the second device transmits data to the two-way communication module of the first device.

Step 1207. The two-way communication module of the first device informs the service module that the reply of the peer end (that is, the second device) is received.

Step 1208. The service module of the first device performs service logic processing.

It can be learned that in this embodiment of the present disclosure, the first device and the second device receive and transmit information from and to each other by using the two-way communication modules, and the first device and the second device may have more information transmission and interaction capabilities. Therefore, more information about payment details can be displayed on the second device to a user, and the user can intuitively view various information about payment details during a payment process, thereby improving user consumption experience.

Based on the foregoing embodiments, the following further describes the payment processing method in the embodiments of the present disclosure by using a specific application scenario, and an example in which the first device is a cash register and the second device is a payment device is used.

Figure 13:
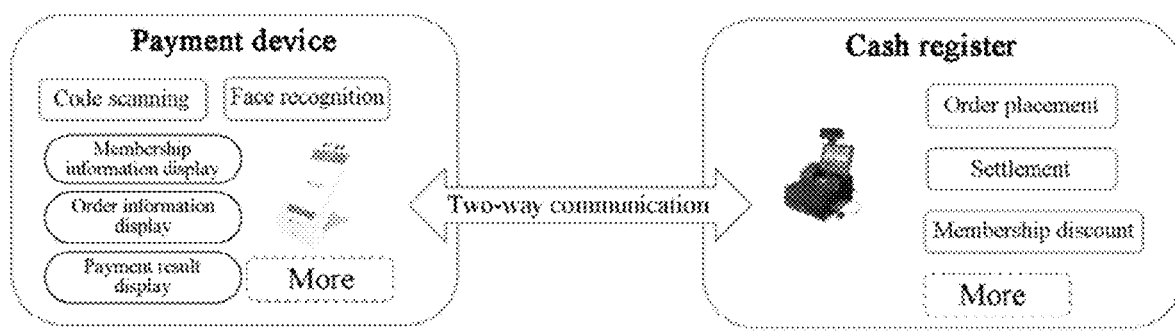
FIG. 13 is a schematic effect diagram of a two-way communication mode between a payment device and a cash register according to one or more embodiments of the present disclosure.

FIG. 13 is a schematic effect diagram of a two-way communication mode between a payment device and a cash register according to an embodiment of the present disclosure. As shown in FIG. 13, the payment device and the cash register communicate with each other in two directions, that is, the payment device can receive and transmit information from and to the cash register, and the cash register can also receive and transmit information from and to the payment device. For example, the payment device can support code scanning or face recognition, membership information display, order information display, payment result display, and the like, and the cash register can support functions such as order placement, settlement, and membership discount acquisition.

In certain embodiments, in this embodiment of the present disclosure, the payment processing method may be divided into two parts: a membership information display stage and a payment detail display stage. The two parts are separately described below.

The first part: Membership information display stage.

Figure 14:
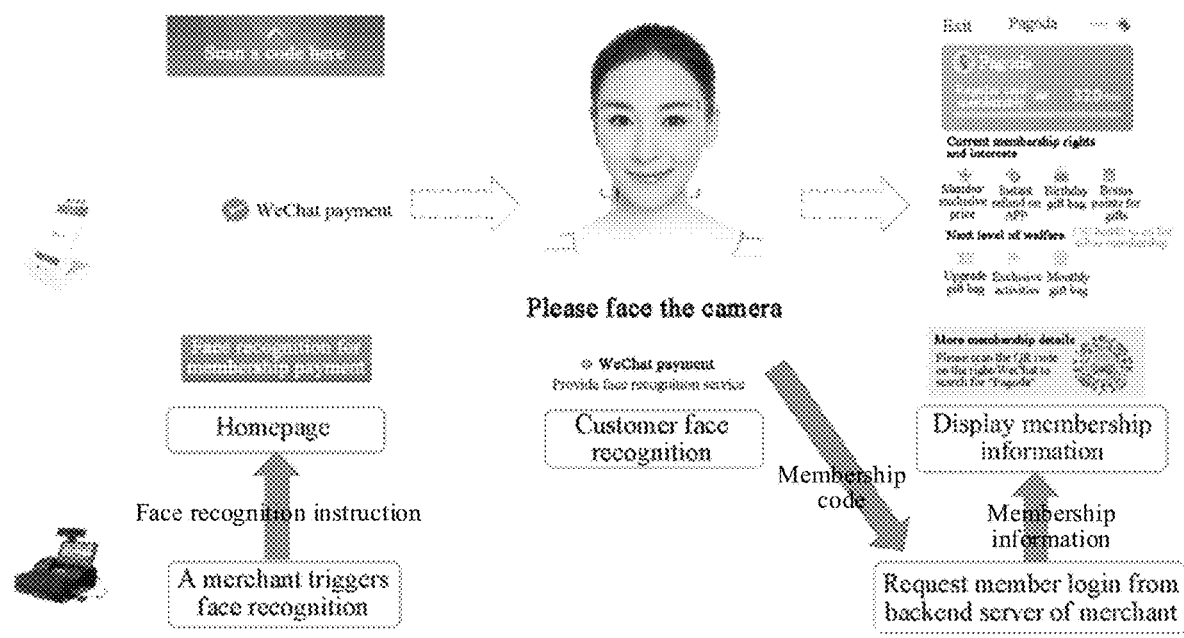
FIG. 14 is a schematic diagram of a process interface of a membership information display stage according to one or more embodiments of the present disclosure.

FIG. 14 is a schematic diagram of a process interface of a membership information display stage according to an embodiment of the present disclosure. As shown in FIG. 14, the following steps are included:

A merchant triggers face recognition by using the cash register, that is, transmit a user identity information request to the payment device.

The payment device is now on a homepage interface, and a payment platform such as WeChat payment is displayed on the homepage interface. In certain embodiments, other payment platforms may further be supported for a user to select from, and only a payment platform is provided as an example herein. In addition, functions such as "scan a code here" and "face recognition for membership payment" are displayed. After the payment device receives a face recognition instruction triggered by the cash register, a face recognition interface for a customer is entered.

Prompt the user "please face the camera", to obtain face information of the user. If the face is successfully recognized by a backend server of the merchant, and a membership code of the user provided by the backend server of the merchant is obtained, the membership code being a membership identity of the user pre-registered at the merchant, the membership code is transmitted to the cash register.

The cash register requests member login from the backend server of the merchant based on the membership code, obtains membership information that is provided by the backend server of the merchant and that corresponds to the membership code, and transmits the membership information to the payment device.

The payment device enters an interface for displaying the membership information, and displays the membership information to the user.

For example, the membership information may include a membership level, a bonus point, current membership rights interests, and the like. The membership level may be, for example, divided into a regular card membership and a silver card membership. The displayed membership information may be configured in advance, and is not limited in this embodiment of the present disclosure. In this way, the user can easily learn of the membership rights and interests of the user.

A second part: Payment detail display stage.

Figure 15:
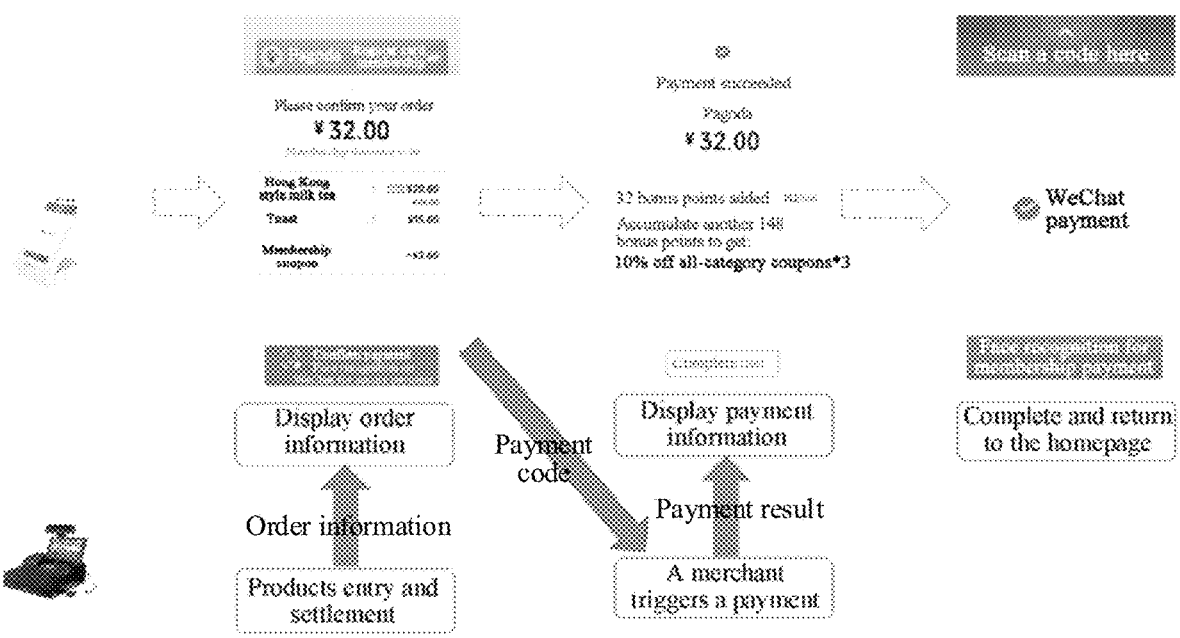
FIG. 15 is a schematic diagram of a process interface of a payment detail display stage according to one or more embodiments of the present disclosure.

FIG. 15 is a schematic diagram of a process interface of a payment detail display stage according to an embodiment of the present disclosure. As shown in FIG. 15, the following steps are included:

A cashier starts entering product information and performs settlement by using the cash register, to generate order information. The cash register transmits the order information to the payment device.

The payment device enters an interface for displaying the order information. In this case, the user may check, according to the order information displayed on the payment device, whether the order information is correct. After determining that the order information is correct, the user may click/tap a "confirm payment" button on the interface to trigger a payment confirmation instruction, so that the payment device generates a payment code of the user after receiving the payment confirmation instruction, and transmits the payment code to the cash register.

The cash register initiates a payment based on the payment code. Through the backend server of the merchant and a backend server of a payment platform selected by the user, the backend server of the payment platform makes a payment for the order information from a corresponding payment account, and returns a payment result to the cash register, to enable the cash register to transmit the payment result to the payment device.

The payment device enters an interface for displaying the payment result and displays the payment result.

For example, the payment result that may be displayed on the interface may include a payment amount and payment success information, and obtained membership rights and interests may also be displayed, which is not specifically limited. In this way, the user can learn of payment information.

The payment is performed and the payment device returns to the homepage interface, that is, an entire payment process is performed.

In this way, through the two-way communication between the payment device and the cash register, the user can intuitively view details of the entire payment process and obtain better consumption experience.

Figure 16:
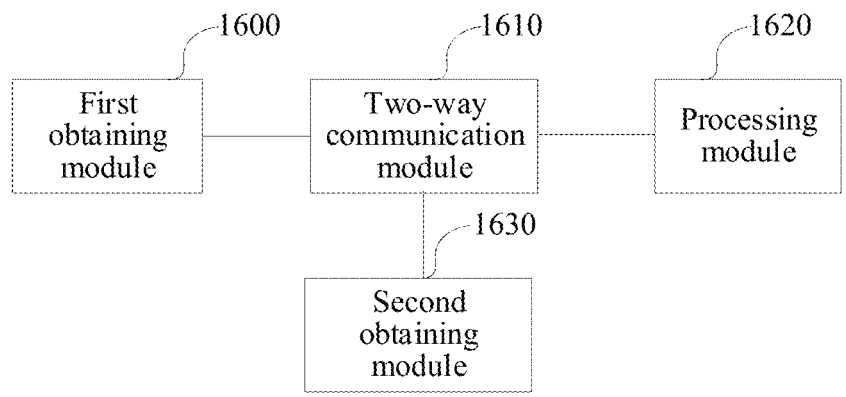
FIG. 16 is a schematic structural diagram of a payment processing apparatus according to one or more embodiments of the present disclosure.

Based on the foregoing embodiments, referring to FIG. 16, in an embodiment of the present disclosure, a payment processing apparatus is mainly applied to a first device and includes: a first obtaining module 1600, configured to obtain order information; a two-way communication module 1610, configured to transmit the order information to a second device for display, and receive a payment code transmitted by the second device, the payment code being generated by the second device according to a user payment identity of a user after receiving a payment confirmation instruction triggered by the user; and a processing module 1620, configured to perform, from a payment account corresponding to the payment code, payment processing on the order information based on the payment code, to obtain a payment result. The two-way communication module 1610 is further configured to transmit the payment result to the second device for display.

In certain embodiments, before the order information is obtained, the two-way communication module 1610 is further configured to transmit a user identity information request to the second device, and receive user identity information transmitted by the second device, the user identity information being obtained by the second device according to an identity characteristic entered by the user.

The payment processing apparatus further includes: a second obtaining module 1630, configured to obtain membership information corresponding to the user identity information according to the user identity information when or in response to determining the user identity information indicates that the user is a registered member user, the membership information indicating user registration information and rights and interests information associated with a consumption behavior.

The two-way communication module 1610 is further configured to transmit membership information to the second device for display.

In certain embodiments, when or in response to determining the identity characteristic is face information, the user identity information is obtained by the second device according to the acquired face information through matching by using a server, where when or in response to determining the user identity information indicates that the user is a registered member user, the user identity information is a membership code of the user.

In certain embodiments, after the order information is transmitted to the second device, the first obtaining module 1600 is further configured to: update, after determining that an order modification request returned by the second device is received by the two-way communication module 1610, the order information according to the order modification request.

In certain embodiments, the apparatus and the second device receive and transmit data packets from and to each other based on two-way communication modules.

In certain embodiments, when the apparatus and the second device receive and transmit data packets from and to each other based on the two-way communication modules, the two-way communication module 1610 is configured to: transmit, by the apparatus, the data packet through a service layer, an application layer, a transport layer, and a link layer sequentially, and receive the data packet through the link layer, the transport layer, the application layer, and the service layer sequentially; and transmit, by the second device, the data packet through the service layer, the application layer, the transport layer, and the link layer sequentially, and receive the data packet through the link layer, the transport layer, the application layer, and the service layer sequentially.

In certain embodiments, a standard read interface, write interface, and control interface are defined at the link layer, and the physical communication link is used as a link layer protocol, so that the data packet is transferred to the transport layer through the physical communication link, the standard read interface, write interface or control interface, and the data packet is transferred to the physical communication link through the transport layer, the standard read interface, write interface or control interface.

In certain embodiments, the physical communication link of the link layer adopts any one of an RS232 interface, a USB, a network cable, and Bluetooth.

In certain embodiments, connectivity of the physical communication link of the link layer is detected at the transport layer by using a heartbeat keepalive mechanism.

Figure 17:
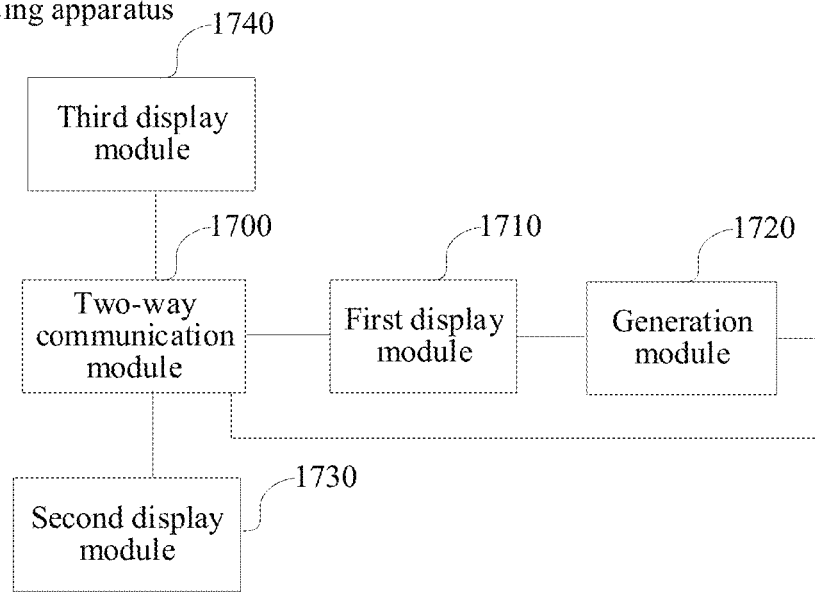
FIG. 17 is a schematic structural diagram of another payment processing apparatus according to one or more embodiments of the present disclosure.

Based on the foregoing embodiments, referring to FIG. 17, in an embodiment of the present disclosure, another payment processing apparatus is mainly applied to a second device and includes: a two-way communication module 1700, configured to receive order information transmitted by a first device; a first display module 1710, configured to display the order information; a generation module 1720, configured to generate a payment code according to a user payment identity of a user after a payment confirmation instruction triggered by the user is received, the two-way communication module 1700 being further configured to transmit the payment code to the first device, and receive a payment result transmitted by the first device, the payment result being obtained by the first device based on the payment code by performing, from a payment account corresponding to the payment code, payment processing on the order information; and a second display module 1730, configured to display the payment result.

In certain embodiments, before the order information transmitted by the first device is received, the two-way communication module 1700 is further configured to: receive a user identity information request transmitted by the first device; obtain user identity information according to an identity characteristic entered by the user, and transmit the user identity information to the first device; and receive membership information transmitted by the first device, the membership information being obtained according to the user identity information when or in response to determining the first device determines that the user identity information indicates that the user is a registered member user, the membership information indicating user registration information and rights and interests information associated with a consumption behavior.

The payment processing apparatus further includes a third display module 1740, configured to display the membership information.

Figure 18:
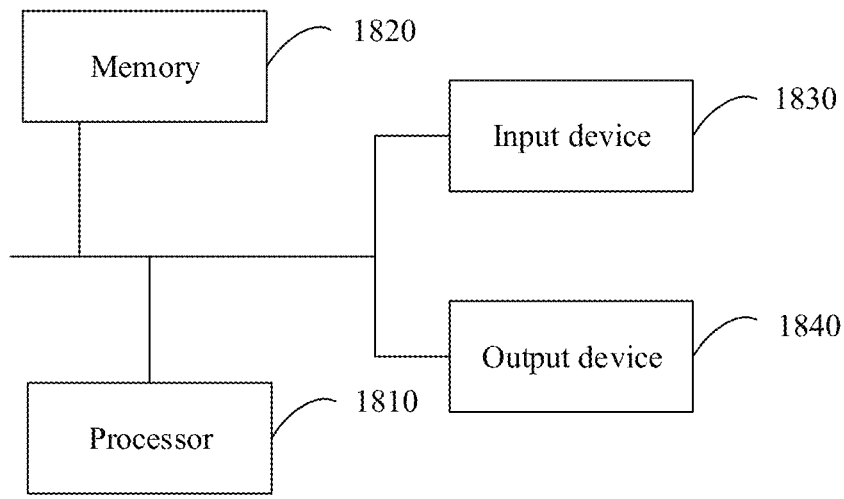
FIG. 18 is a schematic structural diagram of a server according to one or more embodiments of the present disclosure.

Based on the foregoing embodiments, FIG. 18 is a schematic structural diagram of a server according to an embodiment of the present disclosure.

This embodiment of the present disclosure provides a server. The server may include a processor (central processing unit) 1810, a memory 1820, an input device 1830, an output device 1840, and the like. The input device 1830 may include a keyboard, a mouse, a touchscreen, and the like. The output device 1840 may include a display device, such as a liquid crystal display (LCD) or a cathode ray tube (CRT).

The memory 1820 may include a read-only memory (ROM) and a random access memory (RAM), and provide program instructions and data stored in the memory 1820 for the processor 1810. In this embodiment of the present disclosure, the memory 1820 may be configured to store a program of any payment processing method in the embodiments of the present disclosure.

The processor 1810 invokes the program instructions stored in the memory 1820, and the processor 1810 is configured to executes the program of any payment processing method in the embodiments of the present disclosure according to the obtained program instructions.

The foregoing server may be the first server or the second server in the present disclosure, and performs a corresponding processing operation based on a request of the first device or the second device, and details are not described herein again.

Figure 19:
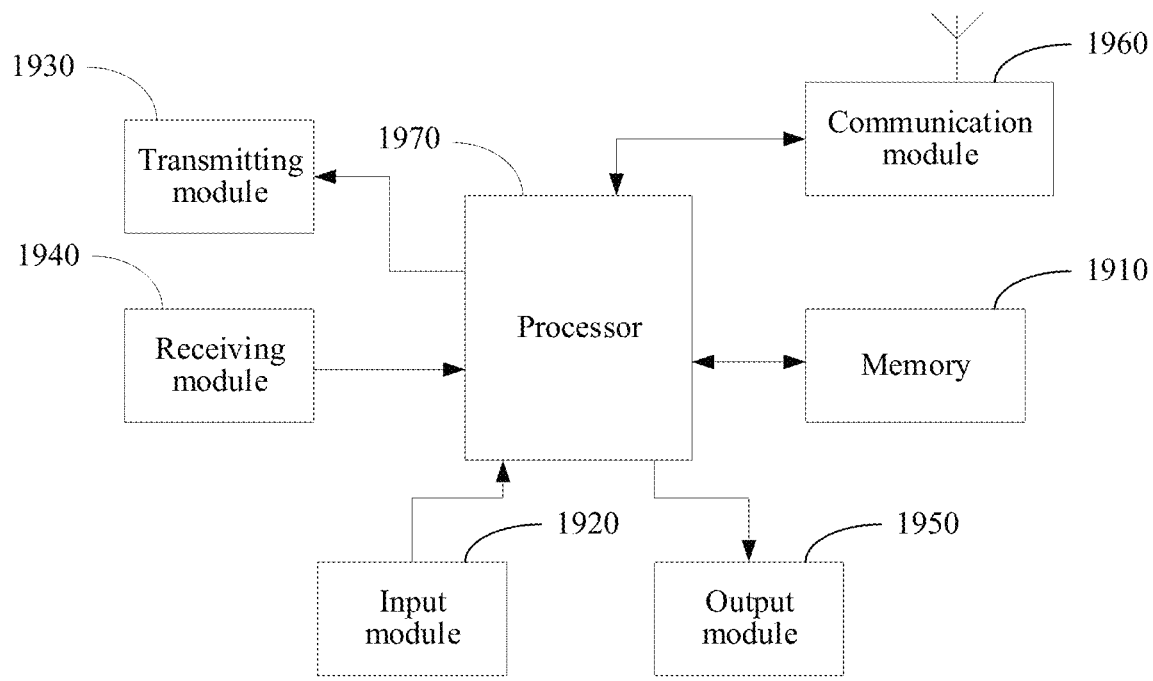
FIG. 19 is a schematic structural diagram of an electronic device according to one or more embodiments of the present disclosure.

Based on the foregoing embodiments, FIG. 19 is a schematic structural diagram of an electronic device according to an embodiment of the present disclosure.

This embodiment of the present disclosure provides an electronic device. The electronic device may be, but is not limited to, a mobile phone, a tablet computer, a computer, a payment device, or the like. The electronic device may include a memory 1910, an input module 1920, a transmitting module 1930, a receiving module 1940, an output module 1950, a communication module 1960, and a processor 1970.

In certain embodiments, the memory 1910 may include a ROM and a RAM, and provide program instructions and data stored in the memory 1910 for the processor 1970, and may further store an operating system of the electronic device, an APP, a module, and various data used by the electronic device.

The input module 1920 may include a keyboard, a mouse, a touchscreen, and the like, and is configured to receive a digit, character information or a touch operation inputted by the user, and generate a key signal input related to user settings and function control of the electronic device. For example, in this embodiment of the present disclosure, the input module 1920 may receive an operation of confirming the order information and an entered identity characteristic of the user on the electronic device.

The transmitting module 1930 may provide an interface between the electronic device and a server, and provide an interface with another electronic device.

The receiving module 1940 also provides an interface between the electronic device and a server, and provide an interface with another electronic device.

The output module 1950 may include a display module, such as an LCD or a CRT. The display module may be configured to display information entered by the user or information provided to the user, or operation interfaces of various electronic devices.

The communication module 1960 includes, but is not limited to, a wireless fidelity (Wi-Fi) module, a Bluetooth module, an infrared communication module, and the like. When communicating with another electronic device, the communication module 1960 may be the two-way communication module in the embodiments of the present disclosure, and implements mutual information transmission and reception based on a two-way communication framework.

The processor 1970 is a control center of the electronic device, and connects various parts of the entire electronic device by using various interfaces and lines. By running or executing a software program and/or a module stored in the memory 1910, and invoking data stored in the memory 1910, the processor 1970 performs various functions of the electronic device and processes data, thereby performing overall monitoring on the electronic device.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In certain embodiments, a structure of the electronic device shown in FIG. 19 is merely one of the examples, and may include more or fewer components than those shown in the figure, or some components may be combined, or a different component deployment may be used.

The electronic device in this embodiment of the present disclosure may be the first device or the second device in the present disclosure, and may correspondingly perform the payment processing method provided in the embodiments of the present disclosure.

Based on the foregoing embodiments, an embodiment of the present disclosure provides a computer-readable storage medium, storing a computer program, the computer program, when executed by a processor, implementing the payment processing method according to any method embodiment described above.

Based on the foregoing embodiments, an embodiment of the present disclosure provides a computer program product including instructions, the computer program product, when run on a computer, causing the computer to perform the steps of the payment processing method according to any method embodiment described above.

A person skilled in the art can understand that the embodiments of the present disclosure may be provided as a method, a system, or a computer program product. Therefore, the present disclosure may use a form of hardware-only embodiments, software-only embodiments, or embodiments combining software and hardware. Moreover, the present disclosure may use a form of a computer program product that is implemented on one or more computer-usable storage media (including but not limited to a magnetic disk memory, a CD-ROM, an optical memory, and the like) that include computer-usable program code.

The present disclosure is described with reference to flowcharts and/or block diagrams of the method, the device (system), and the computer program product according to the embodiments of the present disclosure. Computer program instructions can implement each process and/or block in the flowcharts and/or block diagrams and a combination of processes and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more processes in the flowcharts and/or one or more blocks in the block diagrams is generated by using instructions executed by the computer or the processor of the another programmable data processing device.

These computer program instructions may also be stored in a computer-readable memory that can instruct a computer or another programmable data processing device to work in a specific manner, so that the instructions stored in the computer-readable memory generate an artifact that includes an instruction apparatus. The instruction apparatus implements functions specified in one or more processes in the flowcharts and/or one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing functions specified in one or more processes in the flowcharts and/or one or more blocks in the block diagrams.

Although exemplary embodiments of the present disclosure have been described, once a person skilled in the art learn of the basic creative concept, other changes and modifications may be made to these embodiments. Therefore, the appended claims are intended to be construed as covering the exemplary embodiments and all changes and modifications falling within the scope of the present disclosure.

Obviously, a person skilled in the art can make various modifications and variations to the embodiments of the present disclosure without departing from the spirit and scope of the embodiments of the present disclosure. In this way, if these modifications and variations made to the embodiments of the present disclosure fall within the scope of the claims of the present disclosure and equivalent technologies thereof, the present disclosure also intends to include these changes and variations.

What is claimed is:

1. A payment processing method, performed by a first device, the method comprising:
    obtaining order information and transmitting the order information to a second device for display, wherein the second device and the first device are individual devices that transmit data packets between each other based on a two-way communication;
    receiving a payment code transmitted by the second device, the payment code being generated by the second device according to a user payment identity of a user after receiving a payment confirmation instruction triggered by the user, the user being a customer;
    performing, in a payment account corresponding to the payment code, payment processing on the order information based on the payment code, to obtain a payment result;
    obtaining membership information corresponding to user identity information;
    after the payment processing on the order information, updating the membership information;
    transmitting the payment result to the second device, wherein the payment result comprises updated membership information; and
    displaying the payment result on the second device;
    wherein:
    in the two-way communication between the first device and the second device, a data packet is transmitted through a service layer, an application layer, a transport layer, and a link layer sequentially, and a data packet is received through the link layer, the transport layer, the application layer, and the service layer sequentially;
    a standard read interface, a write interface, and a control interface are defined at the link layer that support a plurality of different physical communication links, and differences of the different physical communication links are shielded from the transport layer.

2. The method according to claim 1, further comprising:
transmitting a user identity information request to the second device;
receiving the user identity information, the user identity information being obtained by the second device according to an identity characteristic entered by the user; and
obtaining the membership information corresponding to the user identity information according to the user identity information, in response to determining the user identity information indicates that the user is a registered member user, the membership information indicating user registration information and rights and interests information associated with a consumption behavior.

3. The method according to claim 2, wherein, in response to determining the identity characteristic is face information, the user identity information is obtained by the second device according to the face information through matching by using a server, wherein in response to determining the user identity information indicates that the user is the registered member user, the user identity information is a membership code of the user.

4. The method according to claim 1, further comprising:
updating, after an order modification request returned by the second device is received, the order information according to the order modification request.

5. The method according to claim 1, wherein a physical communication link of the plurality of different physical communication links is used as a link layer protocol, so that the data packet is transferred to the transport layer through the physical communication link and the standard read interface, the write interface or the control interface, and the data packet is transferred to the physical communication link through the transport layer and the standard read interface, the write interface or the control interface.

6. The method according to claim 5, wherein the physical communication link of the link layer adopts any one of an RS232 interface, a USB, a network cable, and Bluetooth.

7. The method according to claim 5, wherein connectivity of the physical communication link of the link layer is detected at the transport layer by using a heartbeat keepalive mechanism.

8. The method according to claim 1, wherein the data packets transmitted between the first device and the second device have a customized protocol packet format corresponding to an agreed implementation logic.

9. The method according to claim 8, wherein receiving the data packet from the link layer to the application layer comprises:
parsing data of the link layer and the data in to a received packet queue;
determining a packet type of a data packet in the received packet queue;
in response to the data packet being a first ACK packet, managing a transmitted data packet according to the first ACK packet;
in response to the data packet including actual data content, processing the data packet, including at least one of: performing packet queue management, performing deduplication processing, or returning a second ACK packet to the link layer; and
in response to the data packet being a heartbeat packet, performing heartbeat management corresponding to a connectivity of the link layer.

10. The method according to claim 9, further comprising:
registering, by the application layer, at the transport layer in advance and monitoring whether the data packet arrives at the transport layer; and
after the transport layer receives the data packet, receiving, by the application layer, the data packet from the transport layer.

11. The method according to claim 8, wherein transmitting the data packet from the service layer to the transport layer comprises:
performing packet assembly on first data transmitted by the application layer and placing the data into a transmit queue in a form of first data packets;
sequentially transmitting the data packets in the transmit queue to the link layer;
waiting for an acknowledgement response from the link layer for a first data packet in the transmitted queue, and retransmitting the first data packet if a time threshold is exceeded;
receiving a second data packet returned by the link layer;
determining, in response to the second data packet being an ACK packet, that the first data packet in the transmitted queue is transmitted successfully, and determining, in response to that no packet is received or a number of retransmissions is exceeded, that the first data packet in the transmitted queue fails to be transmitted.

12. A payment processing method, performed by a second device, the method comprising:
receiving order information transmitted by a first device, wherein the second device and the first device are individual devices that transmit data packets between each other based on a two-way communication;
displaying the order information;
generating a payment code according to a user payment identity of a user after receiving a payment confirmation instruction triggered by the user, and transmitting the payment code to the first device, the user being a customer;
obtaining and updating membership information corresponding to user identity information;
receiving a payment result transmitted by the first device, the payment result being obtained by the first device based on the payment code by performing, in a payment account corresponding to the payment code, payment processing on the order information;
wherein the payment result comprises membership information updated after the payment processing on the order information; and
displaying the payment result,
wherein:
in the two-way communication between the first device and the second device, a data packet is transmitted through a service layer, an application layer, a transport layer, and a link layer sequentially, and a data packet is received through the link layer, the transport layer, the application layer, and the service layer sequentially;
a standard read interface, write interface, and control interface are defined at the link layer that support a plurality of different physical communication links, and differences of the different physical communication links are shielded from the transport layer.

13. The method according to claim 12, wherein before the receiving the order information transmitted by the first device, the method further comprises:
receiving a user identity information request transmitted by the first device;

obtaining the user identity information according to an identity characteristic entered by the user, and transmitting the user identity information to the first device; and receiving the membership information transmitted by the first device, the membership information being obtained by the first device according to the user identity information, in response to determining the first device determines that the user identity information indicates that the user is a registered member user, the membership information indicating user registration information and rights and interests information associated with a consumption behavior.

14. A payment processing apparatus of a first device, comprising:

at least one memory storing computer program instructions; and at least one processor coupled to the at least one memory and configured to execute the computer program instructions and perform:

obtaining order information and transmitting the order information to a second device for display, wherein the second device and the first device are individual devices that transmit data packets between each other based on a two-way communication;

receiving a payment code transmitted by the second device, the payment code being generated by the second device according to a user payment identity of a user after receiving a payment confirmation instruction triggered by the user, the user being a customer;

performing, in a payment account corresponding to the payment code, payment processing on the order information based on the payment code, to obtain a payment result;

obtaining and updating membership information corresponding to user identity information;

transmitting the payment result to the second device, wherein the payment result comprises membership information updated after the payment processing on the order information; and displaying the payment result on the second device; wherein:

in the two-way communication between the first device and the second device, a data packet is transmitted through a service layer, an application layer, a transport layer, and a link layer sequentially, and a data packet is received through the link layer, the transport layer, the application layer, and the service layer sequentially;

a standard read interface, write interface, and control interface are defined at the link layer that support a plurality of different physical communication links, and differences of the different physical communication links are shielded from the transport layer.

15. The payment processing apparatus according to claim 14, wherein the processor is further configured to execute the computer program instructions and perform:

transmitting a user identity information request to the second device;

receiving the user identity information, the user identity information being obtained by the second device according to an identity characteristic entered by the user; and obtaining the membership information corresponding to the user identity information according to the user identity information, in response to determining the user identity information indicates that the user is a registered member user, the membership information indicating user registration information and rights and interests information associated with a consumption behavior.

16. The payment processing apparatus according to claim 15, wherein, in response to determining the identity characteristic is face information, the user identity information is obtained by the second device according to the face information through matching by using a server, wherein in response to determining the user identity information indicates that the user is the registered member user, the user identity information is a membership code of the user.

17. The payment processing apparatus according to claim 14, wherein the processor is further configured to execute the computer program instructions and perform:

updating, after an order modification request returned by the second device is received, the order information according to the order modification request.

18. The payment processing apparatus according to claim 14, wherein a physical communication link of the plurality of different physical communication links is used as a link layer protocol, so that the data packet is transferred to the transport layer through the physical communication link and the standard read interface, the write interface or the control interface, and the data packet is transferred to the physical communication link through the transport layer and the standard read interface, the write interface or the control interface.

19. The payment processing apparatus according to claim 18, wherein the physical communication link of the link layer adopts any one of an RS232 interface, a USB, a network cable, and Bluetooth.

* * * * *